US012722414B1

(12) United States Patent
Dejean

(10) Patent No.: US 12,722,414 B1
(45) Date of Patent: Sep. 1, 2026

(54) SECURITY ITEM OR ASSEMBLY OF THE SECURITY ITEM AND OF ANOTHER OBJECT COMPRISING A FIRST AND A SECOND RASTER

(71) Applicant: OBERTHUR FIDUCIAIRE SAS, Paris (FR)

(72) Inventor: Marie Dejean, Cesson-Sevigne (FR)

(73) Assignee: OBERTHUR FIDUCIAIRE SAS, Paris (FR)

( * ) Notice: Subject to any disclaimer, the term of this patent is extended or adjusted under 35 U.S.C. 154(b) by 152 days.

(21) Appl. No.: 18/281,148

(22) PCT Filed: Mar. 10, 2022

(86) PCT No.: PCT/EP2022/056243
§ 371 (c)(1),
(2) Date: Sep. 8, 2023

(87) PCT Pub. No.: WO2022/189584
PCT Pub. Date: Sep. 15, 2022

(30) Foreign Application Priority Data

Mar. 12, 2021 (FR) ...................................... 2102439

(51) Int. Cl.
*B42D 25/351* (2014.01)
*B42D 25/305* (2014.01)

(52) U.S. Cl.
CPC ......... *B42D 25/351* (2014.10); *B42D 25/305* (2014.10)

(58) Field of Classification Search
CPC ..... B42D 25/351; B42D 25/305; G06K 19/00
USPC ... 283/67, 70, 72, 74, 94, 98, 109, 110, 111, 283/901
See application file for complete search history.

(56) References Cited

U.S. PATENT DOCUMENTS

| | | | | |
|---|---|---|---|---|
| 9,811,723 | B2 | 11/2017 | Rosset et al. | |
| 10,730,336 | B2 | 8/2020 | Dietemann | |
| 10,780,728 | B2 | 9/2020 | Dietemann | |
| 2012/0001411 | A1 | 1/2012 | Rosset et al. | |
| 2012/0174447 | A1 | 7/2012 | Vincent | |
| 2013/0163818 | A1 | 6/2013 | Rosset et al. | |
| 2019/0009609 | A1* | 1/2019 | Dietemann | B42D 25/36 |

OTHER PUBLICATIONS

International Search Report dated May 18, 2022.
French Search Report Nov. 17, 2021.

* cited by examiner

*Primary Examiner* — Justin V Lewis
(74) *Attorney, Agent, or Firm* — IPSILON USA, LLP

(57) ABSTRACT

The present invention relates to security-protected at article comprising the first raster (10) and a second raster (20) or to an assembly of a security-protected article comprising a first raster and of another object comprising a second raster, the first roster comprising a number n of sub-rasters, the sub-rasters and the second raster each consisting of first patterns of the same dimension, separated by second patterns of the same dimension, the second patterns being different in appearance from the first patterns, the n sub-rasters all being phase-shifted from one another by a distance less than x1+x2 and a multiple of the smallest phase-shift between the n sub-rasters, n being greater than or equal to 3, when the first and the second roster are superposed, the first raster being at least partially visible through the second patterns of the second raster and/or the second raster is at least partially visible through the second patterns of the first raster.

23 Claims, 25 Drawing Sheets

SECURITY ITEM OR ASSEMBLY OF THE SECURITY ITEM AND OF ANOTHER OBJECT COMPRISING A FIRST AND A SECOND RASTER

RELATED APPLICATION

This application is a National Phase of PCT/EP2022/056243 filed on Mar. 10, 2022, which claims the benefit of priority from French Patent Application No. 21 02439, filed on Mar. 12, 2021, the entirety of which are incorporated by reference.

FIELD OF THE INVENTION

The present invention relates to the field of security-protected items.

PRIOR ART

In order to guard against counterfeiting and falsification and in order to increase the level of security it is known to use security elements applied to the surface or introduced into the mass or introduced into one or more windows in a security-protected item.

The security-protected item may in particular be chosen from security-protected documents, for example a means of payment, such as a banknote, a bank card, a check or a luncheon voucher, an identity document such as an identity card, a visa, a passport or a driver's license, a security-protected card, a lottery ticket, a travel ticket or a ticket for entry to events, or a security-protection tag.

There are known from patent applications EP 2 367 695, EP 2 585 308, and EP 2 586 014 and from the patent EP 2 454 102 effects of masking of interleaved images by a revelation frame enabling, when the revelation frame and the image are superimposed, observation of one of the interleaved images by movement of the revelation frame relative to the image or by changing the angle of observation.

However, the above patent applications and patents are limited to viewing interleaved images of the combined image one at a time.

There are also known from patent applications EP 3 397 502 and EP 3 397 501 effects of masking of interleaved images of different colors of a combined image by a revelation frame enabling, when the revelation frame and the combined image are superimposed, observation of an image by movement of the revelation frame relative to the image or by changing the angle of observation, the image resulting from the visible part of the combined image having a color depending on the visible interleaved images of the combined image. The above patent applications also describe interleaved images or revelation frames featuring blocks of images or of frames of different widths or phase shifted relative to one another in a particular direction. With systems of this kind changes of color of the revealed image can be observed by movement of the combined image relative to the revelation frame. However, the contrast is not the optimum at all observation angles and a large viewing angle is necessary to observe all of the observable effects.

There exists a need to benefit from security-protected items including an anti-counterfeiting optical system capable of producing optical effects that can contribute to the authentication and/or the identification of the item and possible incorporation of which into an item such as paper can be done relatively easily.

SUMMARY OF THE INVENTION

The invention aims to address this need and, in a first of its aspects, has for object a security-protected item including a first frame and a second frame or an assembly of a security-protected item including a first frame and another object including a second frame,

- the first frame including a number n of first frame sub-frames each consisting of first frame first elementary patterns separated from one another in at least one common first frame extension direction X by first frame second elementary patterns, the first frame first elementary patterns all having the same first frame first pattern dimension $x_1$ in the first frame extension direction X and the first frame second elementary patterns all having the same first frame second pattern dimension $x_2$ in the first frame extension direction X, the first frame second elementary patterns being of visually different appearance under at least one given illumination condition of the first frame first elementary patterns,
- the n first frame sub-frames being all phase shifted relative to one another in the at least one first frame extension direction X by a distance $d_{xij}$ less than $(x_1+x_2)$ and substantially equal to a multiple k of the smallest phase shift m between the n sub-frames, k being between 1 and n−1 inclusive,
- n being greater than or equal to 3, the smallest phase shift m being different from a multiple of the smallest dimensions $x_1$ of the first frame first pattern and $x_2$ of the first frame second pattern in the first frame extension direction X,
- the second frame consisting of second frame first elementary patterns separated from one another in at least one second frame extension direction V by second frame second elementary patterns, the second frame first elementary patterns all having the same second frame first pattern dimension $v_1$ in the second frame extension direction V and the second frame second elementary patterns all having the same second frame second pattern dimension $v_2$ in the second frame extension direction V, the second frame second elementary patterns being of visually different appearance under said at least one given condition of illumination of the second frame first elementary patterns, the distance $x_1+x_2$ in the first frame extension direction X being a multiple of the distance $v_1+v_2$ in the second frame extension direction V,
- the item or the assembly being configured so that, when the first frame and the second frame are superimposed the first frame is visible at least in part through the second frame second elementary patterns and/or the second frame is visible at least in part through the first frame second elementary patterns.

By "the second elementary patterns [ . . . ] being of visually different appearance under [one/the] given illumination condition of the first elementary patterns [ . . . ]" is meant the second elementary patterns have, under one given illumination condition at least, a difference of appearance perceptible to the human eye with or without magnification relative to the first elementary patterns.

The given illumination condition may be a visible, UV or IR wavelength or a visible, IR or UV wavelength range, or a more complex light spectrum, preferably of white light, in particular of daylight.

By "the n first frame sub-frames being all phase shifted relative to one another in the first frame extension direction X by a distance $d_{xij}$ less than $(x_1+x_2)$ and substantially equal to a multiple k of the smallest phase shift m between the n sub-frames, k being between 1 and n−1 inclusive" is meant that each of the n sub-frames has first frame first elementary patterns offset by a smaller distance $d_{xij}$ which is a multiple of a factor k less than (n−1) of the smallest phase shift m between the n sub-frames relative to the position that the first elementary patterns of the other sub-frames would have at the level of said sub-frame. A result of this is that one of the n sub-frames is such that the (n−1) other sub-frames are phase shifted with it by a different multiple between 1 and (n−1) of the smallest phase shift m between the sub-frames.

By "the item or the assembly being configured so that, when the first frame and the second frame are superimposed the first frame is visible at least in part through the second frame second elementary patterns and/or the second frame is visible at least in part through the first frame second elementary patterns" is meant that:

- the second elementary patterns of the first frame and one or more layers of materials separating the first and second frames when the first and second frames are superimposed, where necessary, are at least partially transparent so that the second frame is not totally masked by the second elementary patterns of the first frame and therefore at least in part visible through the second elementary patterns of the first frame, and/or
- the second elementary patterns of the second frame and one or more of the layers separating the first and second frames when the first and second frames are superimposed, where necessary, are at least partly transparent so that the first frame is not totally masked by the second elementary patterns of the second frame and therefore at least in part visible through the second elementary patterns of the second frame.

By "visible" is meant perceptible by sight with or without the aid of a particular instrument, notably by magnification.

With this kind of security-protected item or this kind of assembly, when the first and second frames are superimposed with the parallel directions X and V in which the first and second frames extend, there is at least one relative position of the first frame relative to the second frame for each pair of n sub-frames for which, by observation of the superimposition from the side of the first frame and/or the second frame, said two sub-frames of the n sub-frames generate two revealed sub-images of different visual appearances, in particular different tones and/or opacities.

By "position of the first frame relative to the second frame" is meant throughout the remainder of the description a position of the two frames relative to one another when the latter are physically mobile relative to one another and/or an angle of observation of the superimposed two frames when the latter are separated from one another by a support.

When the first and second frames are superimposed with the parallel directions X and V in which the first frame and the second frame extend, relative movement of the first frame relative to the second frame in the direction in which the two frames X and V extend moves the first frame elementary patterns relative to the second frame elementary patterns, which changes the appearance, in particular the tone and/or the opacity, of the revealed sub-images that can be observed at the level of the different sub-frames of the first frame.

By "movement of the first frame relative to the second frame in the extension direction of the two frames" is meant a movement of the two frames relative to one another in the direction in which the two frames extend when the two frames are mobile relative to one another and/or a change of the angle of observation of the superimposed two frames about an axis perpendicular to the direction in which the two frames extend, depending on the structure of the security-protected item or the assembly.

Because of the structure of the two frames and the given phase shift between the n sub-frames the change of appearance, in particular of tones and/or opacity, by relative movement between the two frames for each sub-frame is of continuous appearance over at least one continuous range of relative positions between the two frames. The revealed sub-images preferably change appearance in accordance with a graduated tone and/or opacity between two visibly different tones and/or two visually different opacities during continuous relative movement between the two frames.

The particular phase shift between the n sub-frames enables each sub-frame to have a substantially identical effect on the corresponding revealed sub-image over a range of relative positions between the two frames of dimension 2 m in the direction in which the first frame extends, which enables a particular effect to be obtained in the revealed image.

The different sub-frames of the first frame therefore yield observable revealed images of different appearance, in particular in terms of opacity and/or tone, according to the relative positions between the two frames, which makes it possible to have multiple visual effects at the level of the various sub-frames of the first frame for static observation (by observation at a relative position of the frames) and dynamic observation (by observation of the effects by relative movement between the frames).

Such a security-protected item or such an assembly makes it possible to visualize a particular effect over a small observation angle and to have some continuity in the observation of the change of the revealed image over a certain range of relative movement between the two frames.

Thanks to the invention it is possible to benefit from a security-protected item offering a new means of authentication consisting in the formation of a multiple tone revealed image featuring a dynamic tonal evolution during relative movement of the two frames and thereby leading to the formation of a particular pattern easily recognizable by the man in the street.

At least one of the first and second frames, preferably both the first and second frames, preferably feature(s) a frame resolution greater than or equal to 800 dpi.

By "frame resolution" is meant the printing resolution at which said frame could be printed. Thus for a frame having a frame resolution of at least 800 dpi it is clear that said frame could be printed perfectly with at least 800 dpi printing but could not be correctly printed with less than 800 dpi printing. Where the first frame is concerned, there result conditions on the dimension of the first or second elementary patterns of the first frame and/or on the smallest phase shift m between the n sub-frames in the extension direction X. Concerning the second frame, there are as a result conditions on the dimension of the first or second elementary patterns of the second frame in the extension direction V.

Each sub-frame and the second frame may be visible to the naked eye at a normal observation distance as having a uniform appearance, in particular a uniform color, at least in parts, the or each color resulting from the combination of the colors of the first and second elementary patterns over said part. In natural light, if the first elementary patterns of said part are blue in color and the second elementary patterns of said part are yellow in color, said part will therefore appear green to the naked eye. If required, this makes it possible to have revealed sub-images each of which has a uniform appearance to the naked eye at a normal observation distance. The sub-frames are then not visible to the naked eye if the first frame is observed as such. The various phase shifted sub-frames are then superimposed differently to the first and second elementary patterns of the second frame, which makes it possible by combining tones and opacities of the visible parts of the two different frames at the level of the sub-frames to have different revealed sub-images at the level of the different sub-frames in tone and/or opacity.

By "normal observation distance" is meant the usual observation distance of a security-protected item, for example 30 cm and preferably 25 cm.

The first frame and/or the second frame may have any appropriate contour, and in particular the contour may define a particular shape that is found elsewhere on the item; the first frame and/or the second frame have for example a contour defining a pattern such as a person, animal, plant, monument or alphanumeric symbol, which appears elsewhere on the item, for example in the form of printing or a watermark.

The revealed images may be observable by reflected light and/or transmitted light and are preferably observable by both reflected light and transmitted light.

The item or the assembly is preferably configured so that, when the first and second frames are superimposed, the first frame is visible at least in part at least through the second elementary patterns of the second frame and the second frame is visible at least in part through the second elementary patterns of the first frame. An image revealed by superimposition of the first and second frames with the extension directions aligned is then observable by reflected light and/or transmitted light by observation from the side of the first frame and by observation from the side of the second frame.

Appearance

The first and second elementary patterns of the first and/or second frame(s) have visually different tones and/or opacities.

The first elementary patterns of at least one of the n sub-frames of the first frame and of the second frame, preferably for each of the n sub-frames of the first frame and/or the second frame, may have visually different tones of the second elementary patterns of the same sub-frame or frame with a colorimetric offset ΔE*94 as per C.I.E. 1994 between the first elementary patterns and the second elementary patterns of the same sub-frame or frame greater than or equal to 2, preferably greater than or equal to 3. This enables observation of a color effect.

The first elementary patterns of at least one of the n sub-frames of the first frame and of the second frame, preferably of each of the n sub-frames of the first frame and/or of the second frame, are preferably different colors from the second elementary patterns of the same sub-frame or frame, respectively. The first elementary patterns of each of the n sub-frames of the first frame and of the second frame are preferably different colors from the second elementary patterns of the same frame.

The first elementary patterns of at least one of the n sub-frames of the first frame and of the second frame, preferably of each of the n sub-frames of the first frame and/or of the second frame, may have visually different opacities from the first elementary patterns of the same sub-frame of the first frame or of the same second frame.

The second elementary patterns of each of the n sub-frames of the first frame and/or the second frame preferably have a lower opacity than the first elementary patterns of the same sub-frame or second frame at one wavelength at least, preferably a visible wavelength.

The first elementary patterns of the first frame are preferably all of the same opacity.

The second elementary patterns of the first frame are preferably all of the same opacity.

The first elementary patterns of the second frame are preferably all of the same opacity.

The second elementary patterns of the second frame are preferably all of the same opacity.

The first elementary patterns of at least one of n sub-frames of the first frame and of the second frame, preferably of each of the n sub-frames of the first frame and of the second frame, are preferably of the same opacity, in particular opaque.

The second elementary patterns of at least one of the n sub-frames of the first frame and of the second frame, preferably each of the n sub-frames of the first frame and of the second frame, are preferably not opaque at one wavelength at least, preferably in the visible light spectrum. The second elementary patterns of at least one of the n sub-frames of the first frame and of the second frame, preferably of each of the n sub-frames of the first frame and/or the second frame, are preferably not opaque over at least one range of wavelengths in the visible spectrum.

The second elementary patterns of at least one of the n sub-frames of the first frame and of the second frame, preferably of each of the n sub-frames of the first frame and/or of the second frame, are preferably transparent at one wavelength at least, preferably a visible wavelength, in particular over a range of wavelengths in the visible spectrum. By "transparent" is meant that said elementary patterns have a transmission factor of more than 80%, better more than 90%, better still more than 95%, of the incident light at said wavelength or over said wavelength range.

The first and/or second elementary patterns of the first and/or second frame may be fluorescent and/or luminescent. When the first and/or second elementary patterns of the first and/or second frame are luminescent, they may or may not be visible in white light.

The first elementary patterns of the first frame may be visually of the same tone and/or of the same opacity as the first elementary patterns of the second frame. The first elementary patterns of the first frame and of the second frame are preferably opaque.

The second elementary patterns of the first frame may be visually the same tone and/or of the same opacity as the second elementary patterns of the second frame. The second elementary patterns of the first and second frames may be transparent. If the conditions of integration into a safety item allow it, this can make possible observation by reflected light and/or transmitted light of the effects described above from both sides of the superimposed the first and second frames.

Alternatively, the first elementary patterns of the first frame are of one or more tones, in particular colors, and/or one or more visually different opacities of the tone or tones, in particular colors, and/or of the opacity or opacities of the first elementary patterns of the second frame. Observation from the side of the first frame and from the side of the second frame can therefore give different tone effects of the revealed image.

The first elementary patterns of the first and second frames are preferably opaque, preferably black, and the second elementary patterns of the first and second frames are preferably transparent.

The first elementary patterns of the first frame are preferably joined to adjacent first frame second elementary patterns and the first elementary patterns of the second frame are preferably joined to adjacent second frame second elementary patterns.

The first elementary patterns of the first frame are preferably of uniform appearance, in particular color and/or opacity, in the extension direction or directions or feature micropatterns of the same tint and/or opacity on a background of the same tint and/or opacity in the extension direction or directions.

The first frame second elementary patterns are preferably of uniform appearance, in particular color and/or opacity, in the extension direction or directions or preferably have micropatterns of the same tint and/or opacity on a background of the same tint and/or opacity in the extension direction or directions.

The second frame first elementary patterns are preferably of uniform appearance, in particular color and/or opacity, in the extension direction or directions or preferably have micropatterns of the same tint and/or opacity on a background of the same tint and/or opacity in the extension direction or directions.

The second frame second elementary patterns are preferably of uniform appearance, in particular color and/or opacity, in the extension direction or directions or preferably feature micropatterns of the same tint and/or opacity on a background of the same tint and/or opacity in the extension direction or directions.

First Frame

The distance $x_1+x_2$ in the first frame extension direction X is preferably substantially equal to the distance $v_1+v_2$ in the second frame extension direction V.

The number n of first frame sub-frames is preferably greater than or equal to 4, better greater than or equal to 5. The number n of sub-frames may be less than or equal to 15, better less than or equal to 10. The maximum possible number of sub-frames is in particular defined by the formation resolution of the first frame.

When the first and second frames are superimposed with parallel extension directions X and V of the first frame and of the second frame there exists at least one position of the first frame relative to the second frame for which, by observation of the superimposition from the side of the first frame or of the second frame, at least three sub-images with different tones and/or opacities are revealed at the level of the three first frame sub-frames.

The distance $x_1+x_2$ may be less than or equal to 1 mm, preferably less than or equal to 100 μm, better between 20 μm and 80 μm.

The dimension $x_2$ of the first frame second elementary patterns in the first plane extension direction X is preferably greater than or equal to, more preferably substantially equal to, the dimension $x_1$ of the first frame first elementary patterns in the first frame extension direction X.

The product (n−1) m is preferably greater than or equal to, more preferably greater than, $(x_1+x_2)/2$. This enables a good contrast to be obtained between revealed sub-images.

The smallest phase shift m of the n sub-frames is substantially equal to the ratio $(x_1+x_2)/n$. The sub-frames are therefore phase shifted from a base sub-frame by distances $k(x_1+x_2)/n$, k being between 1 and n−1. This enables optimum contrast to be obtained between the different sub-images.

The dimension $x_1$ of the first elementary patterns in the extension direction X is preferably greater than the smallest phase shift m of the n sub-frames.

The smallest phase shift m of the sub-frames is preferably less than or equal to 100 μm, better less than or equal to 50 μm, even better less than or equal to 32 μm.

The smallest phase shift m of the sub-frames is preferably great than or equal to 3 μm, better greater than or equal to 10 μm.

Each of the first frame sub-frames may be a single block or consist of a set of separate blocks.

Each of the first frame sub-frames may represent less than 90% of the total area of the first frame and more than 0.2% of the latter, better less than 80% of the total area of the first frame and more than 5% of the latter.

The first frame sub-frames are preferably disposed in distinct zones of the first frame. At least two of the first frame sub-frames may have part of their contours in common. All the n sub-frames preferably have part of their contour in common with at least one other of the n sub-frames.

Alternatively, the n first frame sub-frames are disposed in partially superimposed zones of the first frame.

The contours of the n sub-frames may form a particular micropattern configured in particular to have an effect of movement in the image revealed by changing the appearance of the corresponding revealed sub-images when the second frame is moved relative to the first frame, the extension directions of the first and second frames being aligned. For example, in the case of a revealed sub-image of a certain color the user may gain the impression, by changing the position of the second frame relative to the first frame, that the colored sub-image is moved from one part of the revealed image to the other. The micropattern is preferably not visible if the first frame is observed by the naked eye.

The micropattern may no longer be observable on changing the orientation of the second frame relative to the first frame, in particular when the extension directions of the first and second frames are not aligned.

The micropattern may be of any shape, in particular represent a text, an alphanumeric symbol, an ideogram, a geometric shape, an object, a person and/or an animal.

Each first frame sub-frame is preferably phase shifted from the adjacent first frame sub-frame(s) by the smallest phase shift between the m sub-frames.

The security-protected item or the assembly may include a second additional frame separated from the second frame and intended to be superimposed on the same first frame.

Second Frame

The second frame is preferably configured so that there exists for each first frame sub-frame a relative position of the two frames in which the second frame first elementary patterns are each visually aligned with one of the first frame first elementary patterns.

The second frame first elementary patterns preferably have lateral edges delimiting the dimension $v_1$ in the second frame extension direction V of the same profile as the lateral edges delimiting the dimension $x_1$ in the first frame extension direction of the first frame first elementary patterns.

The dimension $v_1$ of the second frame first elementary patterns in the second frame extension direction V may be identical or not, and preferably identical, to the dimension $x_1$ of the first frame first elementary patterns in the first frame extension direction X.

The distance $v_1+x_2$ may be less than or equal to 1 mm, preferably less than or equal to 100 μm, even better between 20 μm and 80 μm.

The dimension $v_2$ of the second frame second elementary patterns in the second frame extension direction is preferably greater than or equal to, preferably substantially equal to, the dimension $v_1$ of the second frame first elementary patterns in the second frame extension direction.

The dimension $v_1$ of the second frame first elementary patterns in the second frame extension direction is preferably substantially equal to the dimension $x_1$ of the first frame first elementary patterns in the first frame extension direction.

The second frame preferably has appropriate dimensions to be superimposed simultaneously at least partially on the n first frame sub-frames. The area and/or the length and/or the width and/or the greatest dimension of the second frame is preferably greater than or equal to, respectively, the area and/or the length and/or the width and/or the greatest dimension of the first frame. As a result it is possible to visualize simultaneously the sub-images revealed by all the sub-frames and the user can immediately compare those revealed sub-images with one another to arrive at a conclusion as to the authenticity of the item.

The first and second frames may have substantially the same general contour.

Frame Lines

The first frame and/or second frame first and second elementary patterns are preferably, respectively, first or second frame first and second lines extending in a line direction of said frame, the line direction of said frame forming a non-zero angle with the extension direction of said frame, preferably extending in a line direction of said frame perpendicular to the extension direction of said frame.

The first frame and second frame first lines and second lines are preferably the same width over all their length, their longitudinal edges being parallel to one another.

The first and second lines of the first or the second frame are preferably all the same length. They may be otherwise, however, and at least two first or second lines of the first or second frame may be different lengths. The first or the second frame may have a general contour of identifiable particular shape, such as a person, animal, plant, monument or alphanumeric symbol, which may appear elsewhere on the item, for example in the form of printing or a watermark.

The dimension in the extension direction of the first and/or second frame first lines may be less than or equal to 1 mm, better less than or equal to 100 μm, even better less than or equal to 50 μm, yet better less than or equal to 32 μm.

The first and second lines may be rectilinear or not, for example curved, corrugated or crenelated.

It is preferable for the first frame and/or second frame first and second lines each to be of uniform appearance, in particular of one tone and one opacity, over all of their surface. It is preferable for the first frame first lines all to be of uniform appearance over all their surface, in particular the same tone and the same opacity, and/or the first frame second lines to be all of the same uniform appearance over all their surface, in particular of the same tone and the same opacity, and/or the second frame first lines to be all of the same uniform appearance over all their surface, in particular of the same tone and the same opacity, and/or the second frame second lines to be all of the same uniform appearance over all their surface, in particular of the same tone and the same opacity.

All the first frame sub-frames may have first lines of the same appearance as one another and second lines of the same appearance as one another.

Alternatively, at least two first frame sub-frames may feature first lines of different appearance, in particular different tones and/or opacities, preferably different tones and the same opacity, and/or second lines of different appearance, notably different tones and/or opacities, preferably different tones and the same opacity.

Alternatively, at least one of the first or second frame first or second lines has at least two first or second frame first or second line longitudinal portions each of uniform appearance, the two first or second frame first or second line longitudinal portions being of different appearance, notably different tones and/or opacities, preferably different tones and the same opacity. A plurality of the first or second frame first and/or second lines may have at least two first or second frame first or second line longitudinal portions as described hereinabove, the first and/or second frame having by virtue of the contours of the first or second line longitudinal portions a particular shape such as a person, animal, plant, monument or alphanumeric symbol, that may appear elsewhere on the item, for example in the form of printing or a watermark. All of the first frame first and/or second line longitudinal portions or all of the second frame first and/or second line portions preferably form by their contours the same particular shape, such as a person, animal, plant, monument or alphanumeric symbol, that may appear elsewhere on the item, for example in the form of printing or a watermark. The particular shape may be visible to the naked eye or by magnification, preferably to the naked eye.

Only the first frame first lines or only the first frame second lines or only the second frame first lines or only the second frame second lines preferably have first or second line longitudinal portions as described hereinabove. Alternatively, the first frame first lines and the second frame first lines have first or second line longitudinal portions forming the same particular shape.

Frame Pixels

Alternatively, the first frame first elementary patterns are all formed of pixels and are separated from one another in at least two first frame extension directions X and Y by first frame second elementary patterns, the first frame first elementary patterns being the same shape and the same color as one another and the second first frame second elementary patterns being of the same shape and the same dimensions as one another. The two extension directions X and Y may form between them an angle between 45° and 135° inclusive, better between 60° and 120° inclusive, preferably 90°. The first frame may include p sub-frames all phase shifted relative to one another at least in one of the two first frame extension directions Y by a non-zero distance $d_{yij}$, in particular substantially equal to a multiple of the smallest phase shift between the p sub-frames. The p sub-frames may have the features described above for the n sub-frames independently of the features of the n sub-frames.

The first frame may include at least one sub-frame phase shifted from at least one other sub-frame in the two extension directions X and Y by a distance in each of the directions X and Y as described above. The fact of having phase shifts in the extension direction X and phase shifts in the direction Y makes it possible to have different effects depending on whether the two frames are shifted relative to one another in the direction X or the direction Y.

The second frame first elementary patterns may be in the form of pixels and separated from one another in at least two second frame extension directions V and W by second frame second elementary patterns, the second frame first elementary patterns being the same shape and having the same dimensions as one another and the second frame second elementary patterns being the same shape and having the same dimensions as one another. The two extension directions V and W may form between them an angle between 45° and 135° inclusive, better between 60° and 120° inclusive, preferably 90°.

By "pixels" is meant an individualizable elementary pattern, in particular of polygonal shape, in particular of triangular, hexagonal, rectangular or square shape.

The first elementary patterns of one of the first and second frames may take the form of lines as described above and the first elementary patterns of the other of the first and second frames may take the form of pixels as described hereinabove. This gives the same effect as in the situation where the first and second frames are formed of lines, but a clearer image.

The first elementary patterns of the first frame and of the second frame may take the form of pixels as described hereinabove.

The first frame and/or the second frame may have polarization properties.

The security-protected item may include a polarizing filter. In particular the first and/or the second frame may be produced with the aid of a polarizing filter.

The first frame and/or the second frame may each be produced by at least one of the following steps:

- production of one or more perforations in at least one polarizing filter to form the first or the second frame,
- local heating of at least one polarizing filter, for example with the aid of a laser, so as locally to eliminate the polarizing properties of the filter and to form the first or the second frame,
- selective application, for example by printing and/or gluing, to at least one polarizing filter a diffusing material, for example colloidal silica, and/or adhesive tape, to form the first or the second frame,
- production of at least one selective attack by chemical reaction and/or by emission of luminous radiation, in particular ultra-violet (UV) and/or infrared (IR) and/or laser radiation, on at least one polarizing filter, possibly with the aid of a mask, to form the first or the second frame, in particular so as locally to cancel the polarizing effect of the filter,
- application, in particular by printing or by layering, of at least one polarizing effect, in particular of a polarizing compound, for example with the aid of an ink including said polarizing compound, on a given non-polarizing substrate, in particular a polymer film, to form the first or the second frame, or application, in particular by printing or by layering, of at least one composition including liquid crystals, in particular cholesteric crystals, for example as sold by the company SICPA under the trade name Oasis®, on a given polarizing substrate, in particular a polymer film, to form the first or the second frame. Alternatively, the first and/or the second frame may each be a watermark or a pseudo-watermark, the opacity of the first and/or second frame first and second patterns being different.

Micropatterns

The first frame and/or second frame first elementary patterns and/or second elementary patterns may consist of one or more micropatterns. This enables enhanced security of the security-protected item, the micropattern being for example observed with the aid of a magnifying glass and constituting a level 2 security feature.

Each of the micropatterns may be a number, a text, one or alphanumeric symbols, one or more ideograms representing an object, a person, an animal, a monument, preferably a number, a text, an alphanumeric symbol or one of more ideograms.

The first frame and/or second frame first elementary patterns and/or second elementary patterns may each consists of a plurality of micropatterns, in particular a micropattern repeating periodically in one or more directions over all the dimension of the element in that direction or those directions.

The micropatterns of an elementary pattern may form an apparently continuous line, particularly when observed with the naked eye at a normal observation distance.

All the first frame or second frame first elementary patterns advantageously consist of the same micropattern, in particular a micropattern repeating periodically in one or more directions over all the dimension of the element in that direction or those directions.

The micropatterns have at least one dimension less than or equal to 1 mm, better less than or equal to 100 μm, even better less than or equal to 50 μm. Given their dimensions, the micropatterns cannot be distinguished by eye. For example, the tone of the first frame and/or second frame first elementary patterns and/or second elementary patterns depends on the tone of the micropatterns constituting them and the background.

Observation

The first and/or the second frame may be applied to the security-protected item or the other object by a printing process, in particular offset printing, copper plate printing, laser printing, photogravure printing, letterpress printing or screenprinting, the first and/or the second frame being printed with colored or non-colored inks, visible to the naked eye, under ultraviolet (UV) light and/or infrared (IR) light, opaque, fluorescent, translucent and/or transparent.

Metallization and/or removal of metallization is or are advantageously used in order to prevent counterfeiting by printing. The first and/or the second frame may therefore include metallization and/or removal of metallization, for example of two different metals, in particular copper or aluminum and alloys thereof.

Superimposition

The first and/or the second frame may appear in a zone of the security-protected item that is at least partially transparent, the first and/or second frame being superimposed by folding the security-protected item or by superimposition of the security-protected item with the other object.

The security-protected item may be folded along a median line of the item, preferably parallel to one side of the item, for example a median line passing through the middle of the length of the item.

The first and/or the second frame may be printed with liquid crystals and carried by a zone of the security-protected item or the object polarizing light so that the first and/or second frame is or are visible only with the item folded on itself or with the security-protected item superimposed on the other object.

Change of Viewing Angle

The first and the second frames may be superimposed when separated from one another by a gap of constant thickness. This gap may be formed by a transparent or translucent substrate having on the side of a first face of the substrate the first frame and on the side of a second face of the substrate, opposite the first, the second frame superimposed on the first frame. The image revealed may then change, because of a parallax effect, on changing the direction of observation of the security-protected item. The observable tone of each revealed sub-image may vary on a change of viewing angle, in particular graduated between two different tones.

The gap between the first and second frames is preferably greater than or equal to the distance $v_1+v_2$ corresponding to the period of the second frame, in particular between 10 μm and 1 mm, being for example less than 80 μm.

The substrate may include or consist of a thermoplastic material, for example a polyolefin, for example polyethylene (PE), polyvinyl chloride (PVC), polyester, polyethylene terephthalate (PET), polycarbonate (PC), polyester carbonate (PEC), polyethylene terephthalate glycol (PETG), acrylonitrile butadiene styrene (ABS) or a light collector film for example of the "waveguide" type, for example a luminescent film based on polycarbonate sold by the company BAYER under the product name LYSA®.

The substate may include cellulose-based fibers and in particular paper fibers. In particular, the substrate may be a paper sufficiently translucent to enable viewing through the underlying frame, in particular a tracing paper.

The substrate may equally be rendered transparent locally or otherwise, by watermarking as described in the patent EP 1252389, by compressing and/or embossing a suitable substrate as described in the patent EP 2 516 113, or by application of a generally fatty composition that renders it permanently transparent, for example a compound consisting of oil and a transparent mineral material, as described in the patent U.S. Pat. No. 2,021,141, or for example a compound in the form of a wax combined with a solvent.

The substrate may also be rendered transparent by locally applying a wax by a heat transfer method, as described in the patent U.S. Pat. No. 5,118,526.

There may again be used for the substrate a fibrous layer including a heat-melt material, for example polyethylene, as described in the patent EP 0 203 499, the transparency of which will vary under the local action of the heat.

Security-Protected Item

The security-protected item may be at least partially made of paper or plastic, in particular include a rolled or extruded plastic film.

The security-protected item may include at least one paper jet, in particular based on natural and/or synthetic fibers, for example fibers of cotton or flax in the case of a banknote.

The security-protected item may be at least partially transparent or translucent, in particular opaque to reflected light and translucent to transmitted light.

The first and/or second frame may be carried by a film, a laminated strip, a patch and/or a foil on the security-protected item. The film, the lamination strip, the patch and/or the foil may include metallization and/or removals of metallization, for example of aluminum or copper, or any type of printing.

By "patch" is meant an element with dimensions smaller than those of the security-protected item and that may not extend as far as the edge of the item. The patch may have a polygonal, circular or oval contour or a contour forming a more complex pattern, in particular a pattern representing a text, an alphanumeric symbol, an ideogram, an object, a person, a plant, a monument and/or an animal.

By "foil" or "laminated strip" is meant an element applied in particular hot, for example by transfer onto the security-protected item in particular from a supporting structure. This element may extend continuously from one edge of the item to the opposite edge.

The film, the laminated strip, the patch and/or the foil may include holographic printing and/or liquid crystals.

The first and/or second frame may further be carried by a security strip, incorporated on the surface, in the body or preferably in a window or windows in the security-protected item.

The first and/or second frame may be incorporated in a window in the security-protected item.

The window may be formed on the security-protected item during manufacture thereof.

The window may be formed by a lack of material, for example the local absence of paper, above or below the first and/or second frame, the window preferably being at least partially transparent or translucent from the side of the first and/or second frame opposite the missing material.

The window need not include missing material. The window may for example be at least partially transparent or translucent above and below the first and/or second frame, the transparent or translucent zones being superimposed on one another in such a manner as to be able to observe the two opposite sides of the security-protected item.

The window may be a through-window. The window may consist of missing material superimposed on respective opposite sides of the first and/or second frame. Two sides of the first and/or second frame may thus be observable directly and not through transparent or translucent zones. The first and/or the second frame may be totally or partially incorporated in the window.

The item may feature a plurality of windows as described hereinabove. The windows may all be of the same type or not. Embodiments of windows in the security-protected items are given for example in GB 1 552 853 which discloses the creation of a window in particular by rendering transparent, laser cutting, abrasion or mechanical incision, EP 0 229 645 which describes creation with the aid of masks of a window on one or both faces of a bijet paper, WO 2004/096482 which describes the creation of a window by laser cutting, CA 2 471 379 which describes the creation of a transparent window and association with a security-protected item, and WO 2008/006983 that describes the creation of a transparent window on a bijet paper.

The security-protected item may include a security strip featuring the first and/or second frame, in particular a succession of first and/or second frames.

The security-protected item may include two security strips, one carrying at least one first frame and the other carrying at least one corresponding second frame. The security strip or strips may have a width sufficient to enable the first and/or second frame to be shown completely. The width of the security strip or strips is preferably between 3 and 20 mm inclusive, more preferably between 4 and 10 mm inclusive, and for example equal to 6 mm.

As indicated above, the first and/or second frame advantageously appear(s) in a zone of the item that is at least partial transparent, in particular the first and/or second frame may be at least partially transparent.

The at least partially transparent zone may correspond to an opening on or through the item in which the first and/or second frame is or are placed.

The zone consists for example of translucent tracing paper.

The zone may consist of a polymer layer including for example polyethylene (PE), polyvinyl chloride (PVC), polyester, polyethylene terephthalate (PET), polycarbonate (PC), polyester carbonate (PEC), polyethylene terephthalate glycol (PETG), acrylonitrile butadiene styrene (ABS) or a light collector film for example of the "waveguide" type, for example a luminescent film based on polycarbonate sold by the company BAYER under the product name LYSA®.

The security-protected item and the elements that it includes such as for example a security strip, a patch and/or a foil may include one or more additional security elements as defined hereinafter.

Some of these additional security elements are detectable by eye, in daylight or in artificial light, without using any particular device. These security elements include for example colored fibers or flakes, completely or partially metalized or printed strips. These security elements are referred to as first level elements.

Other types of security elements are detectable only with the aid of a relatively simple device, such as a lamp emitting ultraviolet (UV) or infrared (IR) light. These security elements include for example fibers, flakes, bands, strips or particles. These security elements may be visible to the naked eye or not, for example being luminescent under illumination by means of a Wood's lamp emitting a wavelength of 365 nm. These security elements are referred to as second level elements.

Other types of security elements necessitate for their detection a more sophisticated detection device. These security elements are for example capable of generating a specific signal when they are subjected simultaneously or otherwise to one or more sources of external excitation. Automatic detection of the signal enables authentication of the item where appropriate. These security elements include for example trackers taking the form of active materials, particles or fibers, capable of generating a specific signal when these trackers are subjected to optronic, electrical, magnetic or electromagnetic excitation. These security elements are referred to as third level elements.

The additional security elements present in the security-protected item may have first, second or third level security characteristics.

In particular, a fluorescent layer preferable invisible in visible light is disposed:

a) between the first and second frames when the latter are superimposed, and/or
b) on the first frame on the side opposite the second frame when the latter are superimposed, and/or
c) on the second frame on the side opposite the first frame when the latter are superimposed.

Said fluorescent layer may be a coating, printing, a film or a substrate, in particular a substrate of the first and/or second frame.

Moreover, as described hereinabove the first and/or second frame first and/or second elementary patterns may be fluorescent and/or luminescent.

In a variant advantageously enabling combination of two fluorescent layers, the security-protected item or the superimposed security-protected item and the other object comprise at least the following successive layers:

- a first frame,
- a first fluorescent layer preferably invisible in visible light,
- a second frame, and
- a second fluorescent layer preferably invisible in visible light.

Said security-protected item or said superimposition of the security-protected item and the other object are observed in particular by observation of the side with the first frame or the side with the second fluorescent layer when illuminated by UV light.

The security-protected item may be a means of payment, such as a banknote, a check, a bank card or a luncheon voucher, an identity document such as an identity card or a visa or a passport or a driving license, a lottery ticket, a security-protected card, a transport ticket or an entry ticket to cultural or sporting events.

Imaging Device

Alternatively, the other object is an electronic imaging device enabling a first image to be formed so as to be able to superpose it on a second image present on the security-protected item, the first image being one of the first and second frames and the second image being the other of the first and second frames.

By "electronic imaging device" is meant an electronic device enabling an image to be produced by display or projection.

The electronic imaging device may include a screen of any known type on which the first image is displayed.

The electronic imaging device may be a projector of any known type with or without a screen on which the projection is effected. The projector may enable the first image to be projected on a background or on the security-protected item.

The electronic imaging device preferably enables generation of a pixelated image each pixel of which is individually addressable, preferably with at least 256 shades of gray or colors and/or with a resolution between 50 and 1000 dpi inclusive.

The electronic imaging device may be a projector projecting visible, infrared (IR) and/or ultraviolet (UV) light.

The second image may appear on a non-opaque zone of the security-protected item. A zone of reduced opacity of this type may in particular correspond to a thinner zone, a zone rendered transparent or a zone comprising at least one layer of a non-opaque material. The opacity of said non-opaque zone will in particular be sufficiently low to enable observation of the first image by transmission.

The item and the imaging device may or may not come into contact when the images are superimposed.

The first and/or second image may have polarization properties.

For example, the first image is produced by the electronic imaging device by means of polarized light, in particular rectilinear, circular or elliptically polarized light. The electronic imaging device may include a screen emitting polarized light or projecting polarized light.

The security-protected item may include a polarizing filter. In particular the second image may be produced with the aid of a polarizing filter.

The second frame may be produced by at least one of the methods described above.

Note that, depending on the desired effect, the steps set out above will be carried out in such a manner as to form an image that is the positive or negative image of the second image. In particular, there may be locally applied on at least one polarizing filter, for example by printing, a polyether-based aliphatic polyurethane, for example such as that sold by the company LAMBERTI under the product name Esacote® PU 21/S.

In accordance with last of the abovementioned possibilities, when the method according to the invention is used the compound including cholesteric liquid crystals is situated between the polarizing substrate and the electronic imaging device, the cholesteric liquid crystals modifying the polarized light from the electronic imaging device that is not blocked by the substrate and the zones covered with cholesteric liquid crystals appearing transparent when the polarizing substrate is oriented in the opaque manner.

On the other hand, if the polarizing substrate is situated between the compound including cholesteric liquid crystals and the electronic imaging device, the cholesteric liquid crystals have an optically variable effect when the polarizing substrate is oriented in the opaque manner. The optically variable effect of the cholesteric liquid crystals is more generally known as a "colorshift" effect, the color of the cholesteric liquid crystals depending on the angle of observation and the latter being in particular observed on a dark, preferably black, background. The "colorshift" effect of the cholesteric liquid crystals may constitute an additional security measure for authenticating and/or identifying the security-protected item.

The second image is therefore defined by a first polarizing material superimposed on a second polarizing material, the first material in particular forming patterns corresponding to the second image and the second material being continuous. The first material preferably consists of printed cholesteric liquid crystals and the second material is preferably a linearly polarizing substrate.

By "patterns corresponding to the second image" is meant that said patterns form the positive or negative second image.

When the first and second images have polarizing properties there advantageously exists only one orientation of the one relative to the other enabling the one partially to mask the other. In other words, there is only one orientation of the first image relative to the second image making it possible not to be able to observe the first image through polarizing zones of the second image and vice-versa. In fact, the first and second images having polarizing properties consist of polarizing zones and non-polarizing zones. If they are placed in front of a light source emitting polarized light, there exists only one orientation in which the polarizing zones become opaque.

In particular, when the item includes a polarizing film, there exists for example only one orientation of the second image relative to the first image projected or displayed by the electronic imaging device by means of polarized light, which enables the polarizing filter to mask the polarized light from the electronic imaging device. The polarizing filter may appear opaque, in particular black in color, only in this preferably unique orientation of the first image relative to the second image.

The presence of a unique orientation of the first and second images relative to one another as described hereinabove may enable authentication and/or identification of the security-protected item at a first security level.

The electronic imaging device, for example the screen of the electronic imaging device, and/or the security-protected item may include an indicator enabling the user to be informed how to position the first and second images relative to one another to obtain said orientation, for example a visual marker.

In accordance with a variant embodiment the second image is printed with a compound, in particular liquid crystals, visible only when placed in front of an electronic imager emitting polarized light, in particular a liquid crystal screen. The second image is advantageously transparent under non-polarized illumination, for example under natural light, and is visible under polarized illumination by means of the electronic imaging device, which adds supplementary security protection to the security-protected item.

The security-protected item may include an integrated microcircuit, for example an RFID chip or an optical chip (activated for example by the light from the electronic imaging device) able to communicate with the electronic imaging device for the latter to produce, in particular display and/or project, information on how to position the first and second images relative to one another to obtain said orientation.

The security-protected item may include an integrated microcircuit, for example an RFID chip or an optical chip, able to communicate with the electronic imaging device so that the latter produces at least one first image the association of which with the second image enables execution of the method according to the invention. In particular, the electronic imaging device may produce at least one first image associated with a second image of the security-protected item by communication between the electronic imaging device and the integrated microcircuit.

The electronic imaging device may produce only one animated or unanimated image, for example a movement in translation, said only one image constituting the first image. Alternatively the electronic imaging device may produce a video representing the first image in motion, for example in movement in translation.

The electronic imaging device may further produce at least one first image from a photo and/or a video of the security-protected item, in particular from the second image of the security-protected item or an identifier present on the item, for example a logo or a serial number. The photo and/or video may be produced with the electronic imaging device, an image capture device, for example a digital video camera, connected to the electronic imaging device by a wired or wireless connection, and/or transferred to the electronic imaging device, for example from a data storage device or via a network such as the Internet.

The first image may be produced only from the photo and/or video of the security-protected item or alternatively produced from the photo and/or video of the security-protected item and additional information, for example information present on the security-protected item, in the photo and/or video, entered by the user or received from a network, for example from a secure server.

The electronic imaging device may include a program enabling identification of the security-protected item, and in particular the second image, or production, in particular display and/or projection, of a first image obtained from a database advising the first image to be used depending on the security-protected item, in particular the second image.

The electronic imaging device may produce a plurality of first images and/or the security-protected item may include a plurality of second images, at least one of the first images enabling observation of the authentication and/or identification information when superimposed on at least one of the second images in accordance with the method of the invention or vice versa.

In particular it can therefore be possible to authenticate and/or identify the security-protected item with different types of electronic imaging device.

Alternatively, a given electronic imaging device can make it possible to authenticate and/or identify security-protected items of different types, in particular including different second images.

For example, the second images differ in their size, their color, their shape, or even by the dimension in the extension direction of the first and/or second frame first and/or second patterns.

The first images may also differ in their size, their color, their shape, even by their dimension in the extension direction of the first and/or second frame first and/or second patterns, or even by the size of the pixels, the spacing between the pixels or the color of the pixels.

The electronic imaging devices may for example differ in their brand, their design, their resolution, their type, namely computer, television or telephone screen, or projector, for example.

The presence of a plurality of first and/or second images can enable authentication and/or identification of the security-protected item independently of the differences mentioned hereinabove.

The first image produced by the electronic imaging device may come from a communication network with which the electronic imaging device communicates, for example a telephone network, the Internet or an internal network, the image being for example downloaded and/or supplied with the electronic imaging device, for example a data medium, for example a hard disc, a USB key, a CD and/or a DVD. The security-protected item may if appropriate include a data medium of this kind. The data medium may be an integrated microcircuit, for example an RFID or optical chip, communicating with the electronic imaging device.

The security-protected item may include a luminescent, for example fluorescent and/or phosphorescent, zone and the electronic imaging device may project the first image onto the security-protected item under ultraviolet (UV) illumination.

In particular, the second image may be luminescent printing, for example on a black opaque background of the security-protected item, onto which the first image is projected under UV illumination. The second image is then visible only under UV illumination.

The second image may be printed on a luminescent background of the security-protected item so that it is visible under both UV illumination and normal illumination.

Authentication Method

The invention further has for object a method for authentication of a security-protected item or an assembly of an item and another object as described above in which the revealed image is observed by superimposition of the first and second frames with the extension directions X and V of the first and second frames aligned and a conclusion is drawn as to the authenticity item at least on the basis of this observation.

Observation of the revealed image preferably includes identification of a particular pattern including at least two revealed sub-images of different appearance, notably different tones and/or opacity.

The method includes changing the positions of the first and second frames relative to one another, in particular by a change of the observation angle and/or movement of the second frame relative to the first frame and observation of a change of appearance, in particular of tones and/or opacity of the revealed image at the level of one or more sub-frames and therefore drawing a conclusion as to the authenticity of the item at least on the basis of this observation.

The method may include identification of a first relative position of the first and second frames at which a first sub-image of the revealed image has a first tone and, for each sub-image different from the first sub-image, a second relative position of the first and second frames different from the first position at which said sub-image has the first tone, the second relative positions of the first and second frames being different from one another. At least one of the different sub-images of the first sub-image is preferably of a different tone from the first tone at the first position of the first and second frames and the first sub-image has a tone different from the first tone at one at least of the second relative positions of the first and second frames.

The method may include, for each first tone of the revealed image at the first position, identification of at least two second relative positions of the first and second frames different from the first position and different from one another for which the first tone is the tone of a sub-image of the revealed image different from that at the first position. The second positions relative to the first position preferably correspond to movements over a distance equal to a multiple of the smallest phase shift m between the sub-frames of the first frame.

The method may include identification of a first relative position of the first and second frames at which all of the sub-images of the revealed image are of visually different tones and identification of a second relative position of the first and second frames for which 2*r sub-images of the revealed image corresponding to 2*r sub-frames of the n sub-frames of the first frame are of the same tone in pairs, the sub-images of the revealed image corresponding the (n−2*r) remaining sub-frames of the first frame being of different tones to the 2*r sub-images corresponding to the 2*r sub-frames of the n sub-frames of the first frame.

The revealed image preferably shows an effect of movement on movement of the first frame relative to the second frame.

If the first and second frames are not superimposed in the item, the first and second frames may be at least partially superimposed by folding the security-protected item and/or superposing the security-protected item and the other object.

Each revealed sub-image preferably features a continuous change of tone over a range of movement of the first frame relative to the second frame from an initial position of the first frame relative to the second frame. The sub-images corresponding to each of the n sub-frames feature identical continuous changes of tone over the same range of movement from different initial positions of the first frame relative to the second frame, the different initial relative positions being offset from one another by a multiple of the smallest phase shift between the n sub-frames.

When the first or second frame is formed by an electronic imaging device the method may include at least one of the following steps:

- at least partial superimposition of the second image of the item with a first image formed by the electronic imaging device in order to enable observation of authentication and/or identification information on the security-protected item,
- at least partial superimposition of the second image of the item with a first image produced by the electronic imaging device following communication between the integrated microcircuit and the electronic imaging device, and/or
- at least partial superimposition of the second image of the item with a first image produced by the electronic imaging device from a photo and/or video of the security-protected item, in particular of the first image.

The photo and/or video may be produced using the electronic imaging device, an image capture device, for example a digital video camera, connected to the object and/or transferred to the electronic imaging device, for example from a data storage network or via a network such as the Internet.

BRIEF DESCRIPTION OF THE DRAWINGS

The invention may be better understood after reading the following detailed description of non-limiting embodiments thereof and examining the appended drawings, in which:

FIG. 42 is a variant of revealed images obtained by superimposition of the second frame from which FIG. 40 is obtained and the first frame from which FIG. 41 is obtained and relative movement of the first and second frames in the extension direction X, FIG. 43 is a variant of revealed images obtained by superimposition of the second frame from which FIG. 40 is obtained and the first frame from which FIG. 41 is obtained and relative movement of the first and second frames in the extension direction Y, FIG. 45 is a variant of revealed images obtained by superimposition of the second frame from which FIG. 40 is obtained and the first frame from which FIG. 44 is obtained and relative movement of the first and second frames in the extension direction X, FIG. 46 is a variant of revealed images obtained by superimposition of the second frame from which FIG. 40 is obtained and the first frame from which FIG. 44 is obtained and relative movement of the first and second frames in the extension direction Y.

DETAILED DESCRIPTION

In what is described hereinafter any change of tone or of opacity described corresponds to a change perceptible visually.

First Frame

Figure 1:
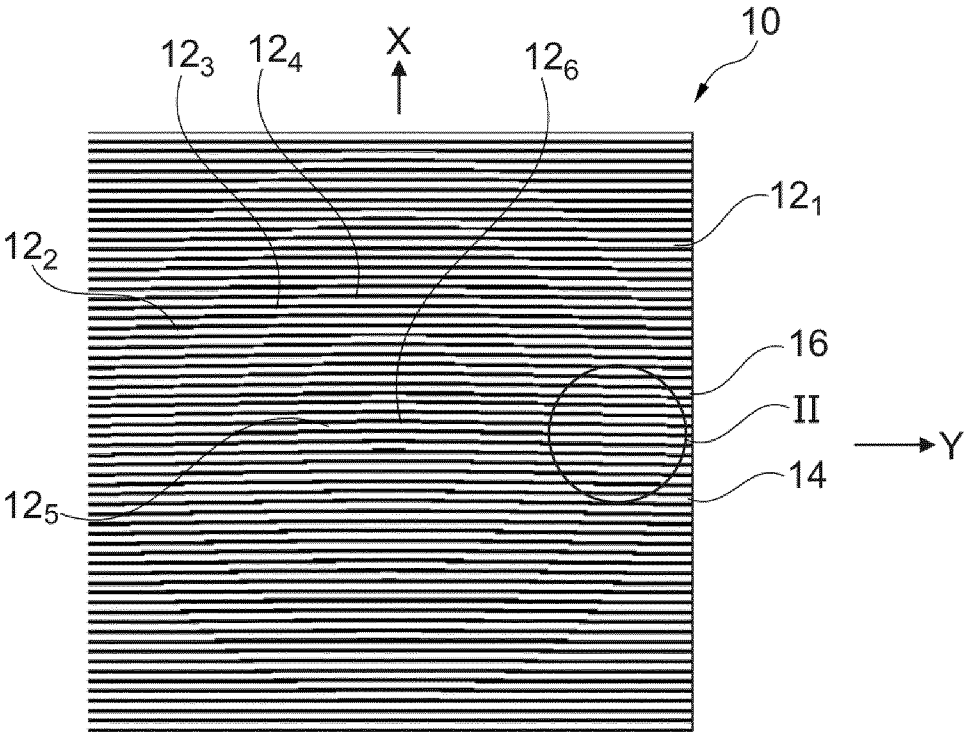
FIG. 1 represents schematically an example of a first frame.
Figure 2:
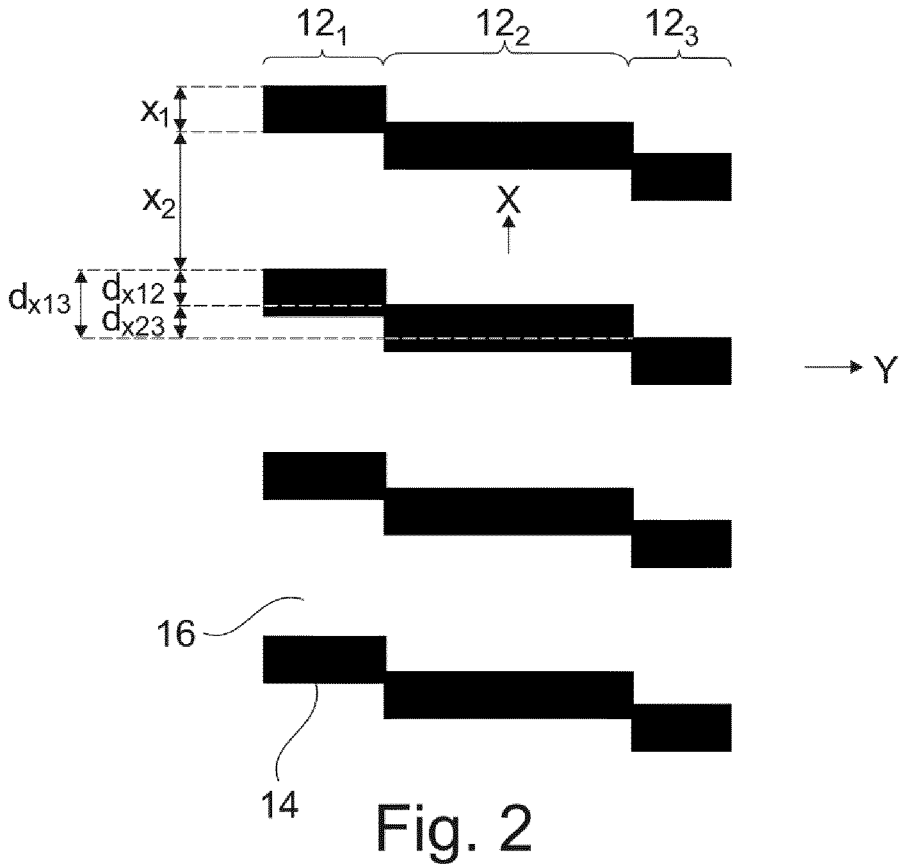
FIG. 2 is a partial view to a larger scale of the detail II from FIG. 1.

There has been depicted in FIGS. 1 and 2 an example of a first frame 10 including six first frame sub-frames $\mathbf{12}_1$ to $\mathbf{12}_6$ each consisting of a periodic alternation in a first frame extension direction X of a first frame first elementary pattern 14 taking the form of a first line and a first frame second elementary pattern 16 taking the form of a second line. The first frame first lines 14 of the various sub-frames $\mathbf{12}_1$ to $\mathbf{12}_6$ are all substantially the same width $x_1$ over all their length and the first frame second lines 16 of the various sub-frames $\mathbf{12}_1$ to $\mathbf{12}_6$ are all substantially the same width $x_2$ along all their length. A result of this is that the various sub-frames $\mathbf{12}_1$ to $\mathbf{12}_6$ all have the same period $x_1+x_2$ and the same general appearance.

Each first frame sub-frame $12_i$ is phase shifted in the extension direction X with each of the other first frame sub-frames by a non-zero distance $d_{xij}$. The adjacent sub-frames $12_i$ and $12_{i+1}$ are phase shifted relative to one another by the same distance $d_{xii+1}$, corresponding to the smallest phase shift m between the first frame sub-frames.

In the example depicted the smallest phase shift m separates two adjacent sub-frames but this could be otherwise. The smallest phase shift m could for example be the phase shift between the sub-frames $12_i$ and $12_{i+2}$.

In the example depicted the distance m is less than the width $x_1$ of the first frame first lines 14. But this could be otherwise.

The first frame first and second lines 14 and 16 have parallel longitudinal axes Y perpendicular to the first frame extension direction X. But this could be otherwise; they could be inclined relative to the first frame extension direction X.

The first frame first and second lines 14 and 16 are rectilinear. But this could be otherwise, as will emerge hereinafter in a variant.

The first frame first and second lines 14 and 16 of each of the sub-frames $12_1$ to $12_6$ are continuous and of uniform appearance over all their length, but this could be otherwise as will emerge hereinafter.

In the example depicted the first frame first lines 14 all have the same dark appearance, for example opaque and black, and the first frame second lines 16 all have the same light appearance, for example transparent or white, being partially transparent or not, preferably at least partially transparent. However, this could be otherwise as will emerge hereinafter in a variant.

The period $x_1+x_2$ is less than or equal to 100 μm, even better between 20 μm and 80 μm.

The smallest phase shift me between the sub-frames $12_1$ to $12_6$ is less than or equal to 50 μm, preferably less than or equal to 32 μm. This value corresponds to a resolution of the first frame 10 less than or equal to 800 dpi, which represents a limit for conventional printers that generally have a maximum definition of 600 dpi, and constitutes a security factor.

In the example depicted the sub-frames $12_1$ to $12_6$ are joined to one another by their contours without being superimposed and represent concentric disks interleaved in one another.

The sub-frames $12_1$ to $12_6$ can be joined by simply juxtaposing them as depicted or joined by junction portions ensuring the continuity of the lines of the sub-frames $12_1$ to $12_6$ adjacent to one another.

Furthermore, the human eye not perceiving at an observation distance greater than or equal to 30 cm details less than approximately 100 μm, a first sufficiently fine frame appears of uniform appearance, here for example substantially gray by transmitted light, the gray level depending on the widths $x_1$ and $x_2$ of the first frame first and second lines 14 and 16. The various sub-frames $12_1$ to $12_6$ are not normally visible to the naked eye. They are visible only by magnification of the first frame, as is the case in FIGS. 1 and 2.

The first frame 10 may be formed by printing, in particular by black and white or quadrichromic printing.

Alternatively, the first frame 10 is formed by metallization and/or by removal of metallization.

As described hereinafter the first frame 10 may also be formed by an electronic imaging device 100.

Second Frame

Figure 3:
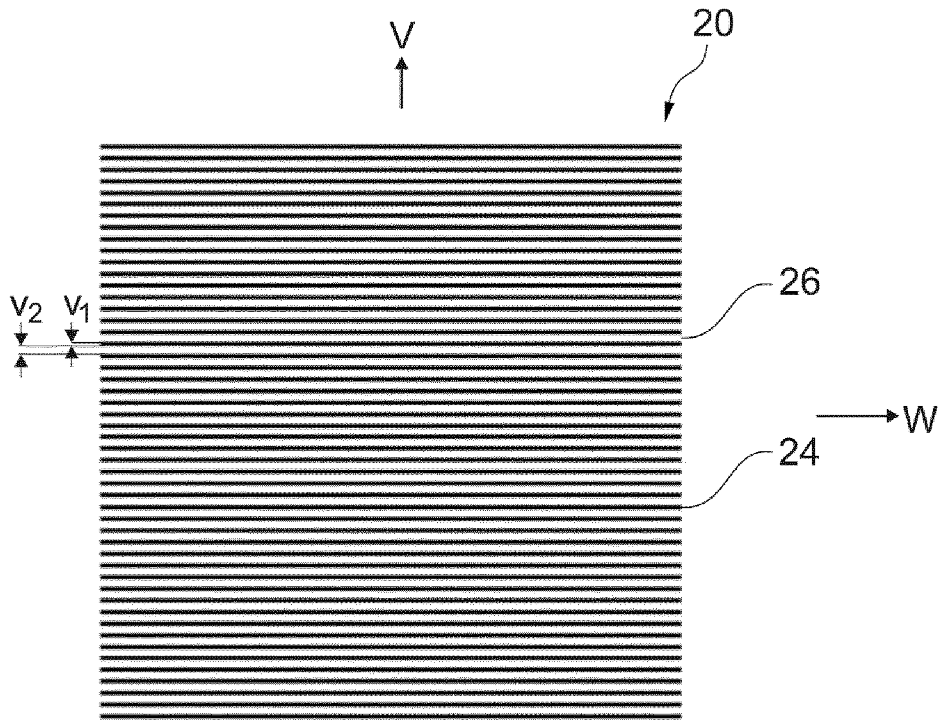
FIG. 3 represents schematically an example of a second frame.

There has been depicted in FIG. 3 an example of a second frame 20 consisting of a periodical alternation in a second frame extension direction V of a second frame first elementary pattern 24 taking the form of a first line and a second frame second elementary pattern 26 taking the form of a second line. The second frame first lines 24 are the same width $v_1$ over all their length and the second frame second lines 26 are all the same width $v_2$ over all their length. The second frame 20 then has a period $v_1+v_2$.

The second frame first and second lines 24 and 26 have parallel longitudinal axes W forming with the second frame extension direction V an angle identical to the angle between the longitudinal axes Y of the first frame lines and the first frame extension direction X.

The second frame first and second lines 24 and 26 are continuous and of uniform appearance over all their length but this may be otherwise, as will emerge hereinafter in a variant.

In the example depicted the second frame first lines 24 all have the same dark appearance, for example opaque and black, and the second frame second lines 26 are all transparent. Alternatively, they could be partially transparent or opaque with a different appearance from the second frame first lines 24 if the first frame second lines 16 are at least partially transparent.

The first frame period $x_1+x_2$ is a multiple of the second frame period $v_1+v_2$. In the depicted preferred example the first frame period $x_1+x_2$ is equal to the second frame period $v_1+v_2$.

In the example depicted the second frame first line width $v_1$ is substantially equal to the first frame first line width $x_1$. However, this could be otherwise, in particular the second frame first line width $v_1$ could be greater than the first frame first line width $x_1$.

The second frame 20 has dimensions enabling it to cover at least two first frame sub-frames $12_1$ to $12_6$ when it is superimposed on the first frame 10, preferably, as depicted, to cover all the sub-frames $12_1$ to $12_6$. In the example depicted the second frame 20 takes the same form as the first frame 10.

The resolution of the second frame 20 is preferably greater than or equal to 800 dpi.

The second frame 20 may be of uniform appearance to the naked eye at a normal observation distance, given its fineness. In particular, the second frame may appear to the naked eye at 15 cm distance as having a uniform color, in particular gray, darker or lighter according to the widths $v_1$ and $v_2$ of the second frame first and second lines 24 and 26.

Sufficiently fine first and second frames enable anti-photocopying security protection to be provided.

The second frame 20 may be formed by printing, in particular by black and white or quadrichromic printing.

Alternatively, the second frame 20 is formed by metallization and/or by removal of metallization.

As described hereinafter the second frame 10 may also be formed by an electronic imaging device 100.

Revealed Image

Figure 4:
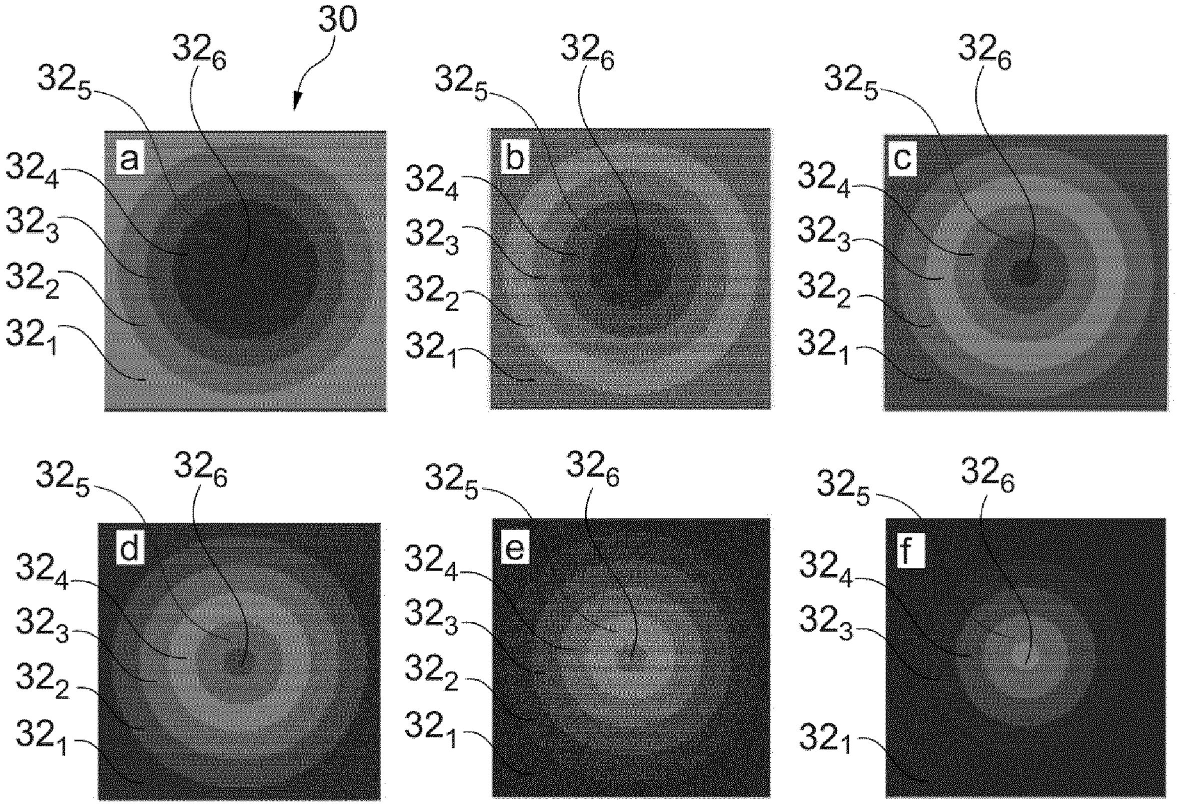
FIG. 4 represents an example of different revealed images obtained by superimposition of first and second frames similar to those from FIGS. 1 and 3 at different positions of the first and the second frames relative to one another, the extension directions of the first and second frames being aligned.

If the first frame 10 and the second frame 20 from FIGS. 1 and 3 respectively are superimposed so that the first and second frame extension directions X and V are aligned at a position of the two frames relative to one another, a revealed image 30 as represented in the FIG. 4 example, image a, can be observed at least by viewing by reflection from the side of the second frame 20. The revealed image 30 then includes a plurality of revealed sub-images $32_1$ to $32_6$ corresponding to different first frame sub-frames at least two of which have different appearances, in particular different shades of gray.

If the first frame 10 and the second frame 20 are superimposed at a position of the two frames 10 and 20 relative to one another, the extension directions X and V of the two frames being aligned, and if the revealed images 30 are observed from the side of the second frame 20, the opaque second frame first lines 24 comes to mask to a greater or lesser degree the first frame first lines 14 of each of the first frame sub-frames $12_1$ to $12_6$, the first frame first lines 14 of each of the first frame sub-frames $12_1$ to $12_6$ being more less visible by transparency through the at least partially transparent second frame second lines 26.

In the example depicted in FIG. 4 the first frame 10 is similar to the first frame 10 depicted in FIG. 1. It features six sub-frames successively phase shifted by the same phase shift m, the contours of which form concentric circles. The second frame 20 is similar to that depicted in FIG. 2. Thus, in the revealed image 30 from FIG. 4, image a:

- the first lines 14 of the sub-frame $12_1$ are largely masked by the first lines of the second frame 24, the corresponding revealed sub-image $32_1$ is then light and results from viewing second frame first lines 24 and parts of first frame first and second lines 14 and 16 visible through the second frame second lines 26,
- the first lines 14 of the sub-frame $12_2$ are partially visible through the second frame second lines 26, being slightly more visible than the first lines 14 of the sub-frame $12_1$, and the corresponding revealed sub-image $32_2$ is then slightly darker than the preceding image $32_1$,
- the first lines 14 of the sub-frame $12_3$ are partially visible through the second frame second lines 26, being slightly more visible than the first lines 14 of the sub-frame $12_2$, and the corresponding revealed sub-image $32_3$ is then slightly darker than the preceding image $32_2$,
- the first lines 14 of the sub-frame $12_4$ are partially visible through the second frame second lines 26, being slightly more visible than the first lines 14 of the sub-frame $12_3$, and the corresponding revealed sub-image $32_4$ is then slightly darker than the preceding image $32_3$,
- the first lines 14 of the sub-frame $12_5$ are partially visible through the second frame second lines 26, being slightly more visible than the first lines 14 of the sub-frame $12_4$, and the corresponding revealed sub-image $32_5$ is then slightly darker than the preceding image $32_4$,
- the first lines 14 of the sub-frame $12_6$ are partially visible through the second frame second lines 26, being slightly more visible than the first lines 14 of the sub-frame $12_5$, and the corresponding revealed sub-image $32_6$ is then slightly darker than the preceding image $32_5$.

The various revealed images $32_1$ to $32_6$ may all be of different tones at a particular position of the two frames 10 and 20 relative to one another as depicted in FIG. 4, image a. Four of the revealed sub-images $32_1$ to $32_6$ may be of identical tones two by two at a particular position of the two frames 10 and 20 relative to one another as depicted in FIG. 4, images c and d, said tones being graduated tones between the dark tone and the light tone of the other two revealed sub-images.

When the superimposition is observed from the side of the first frame 10 the revealed image is observable only if the first frame second lines 16 are at least partially transparent. In this case the second frame first lines 24 are more or less visible through the first frame second lines 16 depending on the phase shift of the sub-frames, which generates the same type of revealed image 30.

When the first frame second lines 16 and the second frame second lines 26 are at least partially transparent the revealed image 30 is visible by transmitted light and reflected light.

As depicted the revealed image 30 may appear uniform to the naked eye. In this case the tone and the opacity of the revealed image 30 depend on the tones and opacities of the first and second frame first and second line parts that are not masked.

Observation of a Change of Revealed Image

As can be seen in FIG. 4 it is possible to vary the observed revealed image 30 by changing the position of the two frames relative to one another, in particular, as described in detail hereinafter, by changing the observation angle and/or by moving the second frame 20 relative to the first frame 10.

It is therefore possible to go from FIG. 4, images a to f, by continuously moving the two frames relative to one another, by changing the observation angle, or really, by physical movement of the two frames one relative to the other.

Between the successive revealed images depicted in FIG. 4, images a to f, the frames 10 and 20 have been moved relative to one another substantially the same distance corresponding to the smallest phase shift m between the various sub-frames $12_1$ to $12_6$.

In these figures it is seen that the revealed sub-images $32_1$ to $32_6$ all change shades of gray. This change of tone gives that impression of movement. The impression is then produced that the light tone of the sub-image $32_1$ from FIG. 4, image a, is moved to the sub-image $32_2$ in FIG. 4, image b, and then successively to the sub-images $32_3$, $32_4$, $32_5$ and $32_6$ on the respective images c, d, e and f from FIG. 4. The same applies to each tone.

By changing the position of the two frames 10 and 20 relative to one another the user is then able to see a change of the revealed image 30 and arrives at a conclusion as to the authenticity of the article in the light of that observation.

Observation by Superimposition on Either Side of a Substrate

Figure 5:
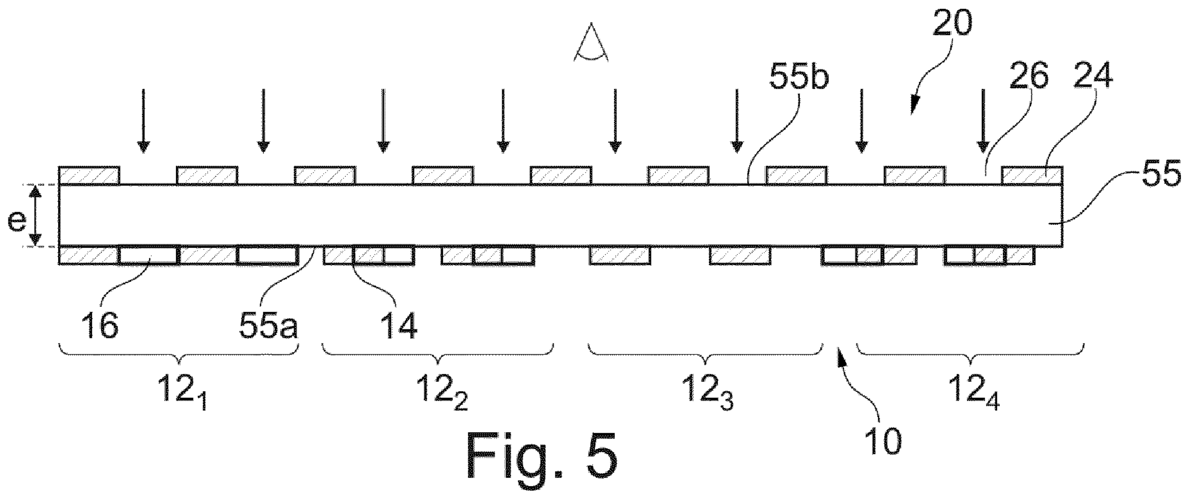
FIG. 5 is a view in section of the superimposed first and second frames as seen at normal incidence.

There has been represented in FIG. 5 a first embodiment in which a security-protected item according to the invention includes a non-opaque substrate 55 of thickness e, for example a perfectly transparent substrate, having a first face **55*a* carrying the first frame 10 and a second face 55*b* of the substrate 55, opposite the first, carrying the second frame 20**. In this embodiment there are four sub-frames $12_1$ to $12_4$.

If the security-protected item 50 is observed from one side or the other of the substrate, a revealed image 30 may be observed. By changing the observation angle $\alpha$, the user changes the relative position of the two frames 10 and 20 and the revealed image 30 is modified as described above and depicted in FIG. 6.

Figure 6:
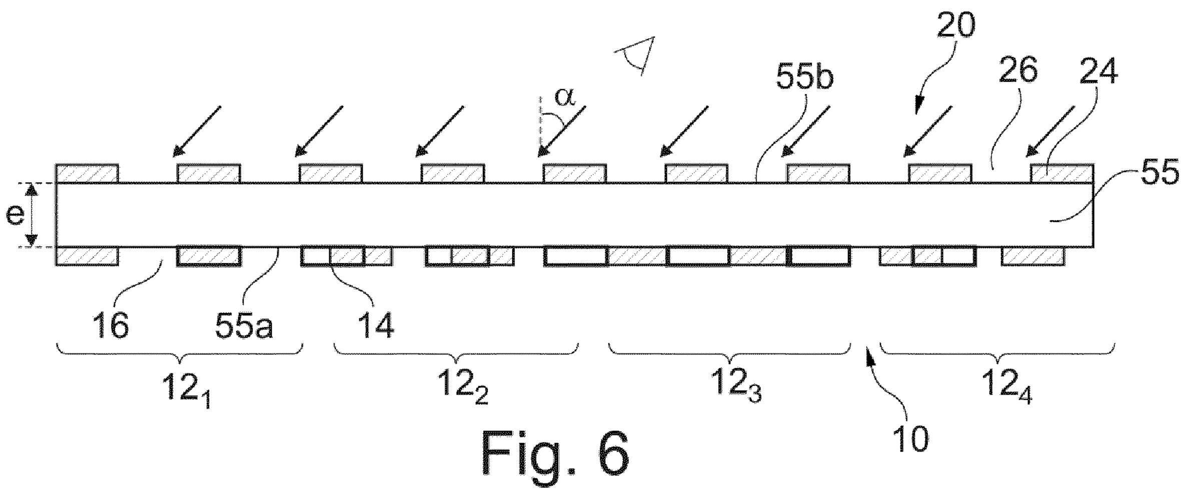
FIG. 6 is the same view as FIG. 5 seen at an angle α.

In the example from FIGS. 5 and 6 the sub-frames $12_1$ to $12_4$ are successively phase shifted $(x_1+x_2)/4$, the first and second frame first elementary patterns 14 and 24 are opaque black $(x_1+x_2)/2$ wide and the first and second frame second patterns 16 and 26 are transparent. By observation at normal incidence to the substrate 55, as depicted in FIG. 5, the parts of the first frame visible through the second frame second patterns 26 are represented by rectangles with a gray contour. The first frame first elementary patterns 14 of the sub-frame $12_1$ are not visible, and the revealed sub-image is then light gray, the first frame first elementary patterns 14 of the sub-frame $12_3$ are completely visible, the revealed sub-image $32_3$ is therefore black, the first frame first elementary patterns 14 of the sub-frames $12_2$ et $12_4$ are half visible, the corresponding revealed sub-images are therefore a shade of gray between light gray and black. By observation at an angle α to the substrate 55 corresponding to the angle arctan ($x_1/e$), as represented in FIG. 6, the parts of the first frame visible through the second frame second patterns 26 are represented by rectangles with a gray contour. The first frame first elementary patterns 14 of the sub-frame $12_1$ are completely visible, the revealed sub-image is therefore black, the first frame first elementary patterns 14 of the sub-frame $12_3$ are not visible, the revealed sub-image $32_3$ is therefore light gray, the first frame first elementary patterns 14 of the sub-frames $12_2$ and $12_4$ are visible, the corresponding revealed sub-images are therefore a gray between light gray and black. On moving from the normal incidence at the angle α, the revealed sub-image $32_1$ will go from light gray to black, via all shades of gray between the two, the revealed sub-image $32_3$ will go from black to light gray through all shades of gray between the two (the opposite of the revealed sub-image $32_1$), the revealed sub-image $32_2$ will go from intermediate gray to black and then again to intermediate gray, assuming all shades of gray between intermediate gray and black, the revealed sub-image $32_4$ will go from intermediate gray to light gray and then again to intermediate gray, assuming all shades of gray between intermediate gray and light gray.

The thickness e of the substrate is preferably greater than or equal to the period $v_1+v_2$ of the second frame.

It may be advantageous to use a substrate 55 the thickness e of which is less than or equal to 100 μm, better less than or equal to 75 μm, for example between 30 and 100 μm inclusive, or even between 35 and 75 μm, limits included or excluded.

Depending on the form of the first and second frame first and second elementary patterns, two-dimensional marking out of the frames may be necessary to facilitate their correct alignment. For example, for frames 10 and 20 as depicted in FIGS. 1 to 3 only the fact that the extension directions X and V are parallel is necessary; however, for corrugated frames (see below), a two-dimensional marking that is more or less precise depending on the amplitude and pre-concealed corrugations may prove desirable. The invention therefore offers a security protection possibility that can be modulated as a function of the protection demanded and of the difficulty of implementation.

For security-protected items including a strip introduced in a window or windows, the first frame 10 may be obtained by micro-photolithography of the strip and a second frame 20 may be produced thanks to offset prints with inks cross-linked under UV light effected at a second stage, during printing of the item.

The second frame 20 may be associated with a pattern printed on the item if necessary.

The pattern of the second frame may be printed elsewhere than superimposed on the first frame 10 on the item, to the same scale or a different scale.

Figure 7:
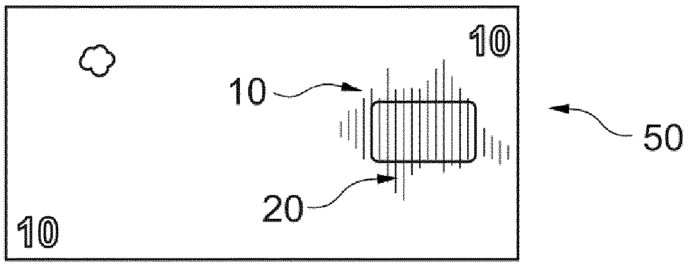
FIG. 7 is an example of a security-protected item.

The printing of the second frame 20 may overlap the first frame 10 and extend on the security-protected item 50 as depicted in FIG. 7.

Figure 8:
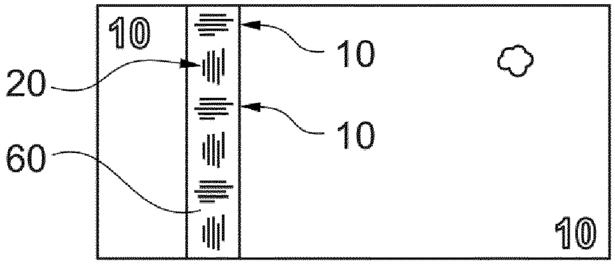
FIG. 8 is a variant security-protected item.

A plurality of first and/or second frames taking for example the form of small squares or rectangles a few millimeters on a side may be presented on the same security strip 60, as depicted in FIG. 8.

Figure 9A:
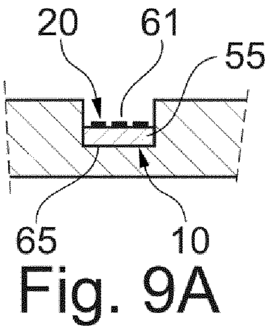
FIG. 9A represents schematically in cross section a variant security-protected item.
Figure 9B:
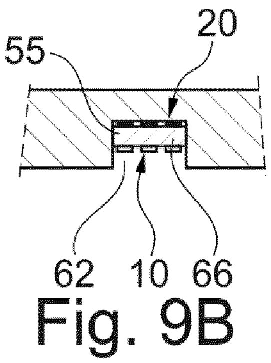
FIG. 9B represents schematically in cross section a variant security-protected item.

If the first frame and the second frame are on strips integrated into a window or windows, as depicted in FIGS. 9A and 9B, the security-protected item 50 may include at least two windows 61 and 62 enabling observation of the respective faces of the strip by reflection.

The item may include at the level of the windows 61 and 62 absences of material and transparent zones 65 and 66 enabling observation of the revealed images 30 from both sides of the security-protected item 50.

Figure 9C:
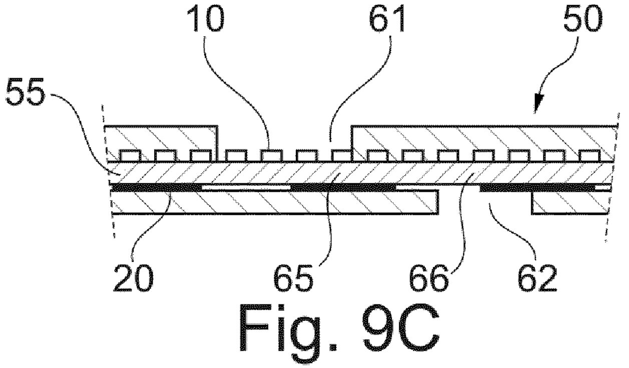
FIG. 9C represents schematically in cross section a variant security-protected item.
Figure 9D:
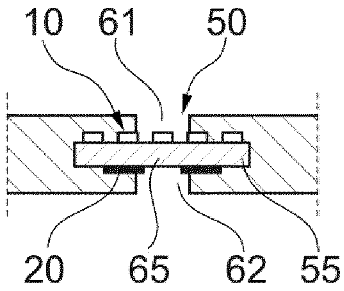
FIG. 9D represents schematically in cross section a variant security-protected item.

The item 50 may also include a through-window 61 as represented in FIG. 9D, the two frames 10 and 20 being at least partially superimposed in this through-window. As a result, it is possible to observe the revealed images 30 both from the recto side and from the verso side of the security-protected item 50.

The two frames 10 and 20 in the form of a security strip may further be incorporated in a security-protected item 50 featuring alternating windows 61 and 62 on the recto side and the verso side, as depicted in FIG. 9C. It is therefore possible to observe the revealed images both from the recto side and from the verso side of the security-protected item 50 at the level of the windows 61 and 62, and in particular because of the absences of material and the transparent zones 65 and 66.

Figure 10:
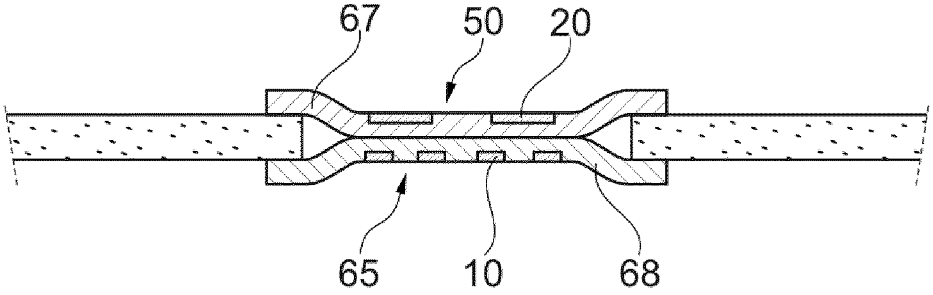
FIG. 10 represents schematically in cross section a variant security-protected item.

There has been represented in FIG. 10 an example of a security-protected item 50 includes a perforation 65 in which are at least partially placed two sub-elements, in particular in the form of foils or patches 67 and 68.

The sub-element 67 includes for example the second frame 20 and the sub-element 68 includes for example the corresponding first frame 10.

The sub-elements 67 and 68 may be at least partially superimposed at the borders of the perforation 65 with or without thickness compensation.

The sub-elements 67 and 68 may be at least partially transparent or translucent.

The revealed images 30 may be observed by reflection or transmission, for example with the aid of a light source situated behind the item 50 during observation.

Figure 11:
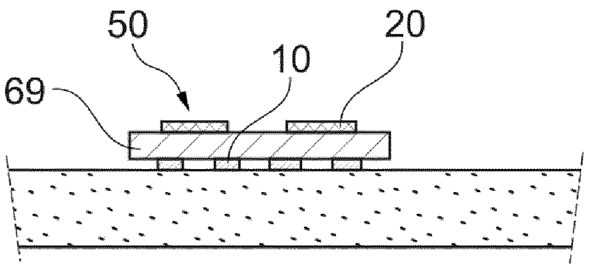
FIG. 11 represents schematically in cross section a variant security-protected item.

In the variant depicted in FIG. 11 the security-protected item 50 includes a first frame 10 in the form of printing. The printing is for example carried out on the surface of the security-protected item 50. Moreover, a sub-element 69, in particular of foil or patch form, is placed on the printing constituting the first frame 10, the sub-element 69 including the corresponding second frame 20, produced for example on the surface of the sub-element 69.

The security-protected item 50 may be opaque or not. The security-protected item 50 may be at least partially transparent or translucent to enable observation of the revealed images 30.

In the FIGS. 10 and 11 examples the first frames 10 and/or the second frames 20 could be produced differently, for example incorporated in or situated above or below the sub-elements 67, 68 and 69.

Figure 12:
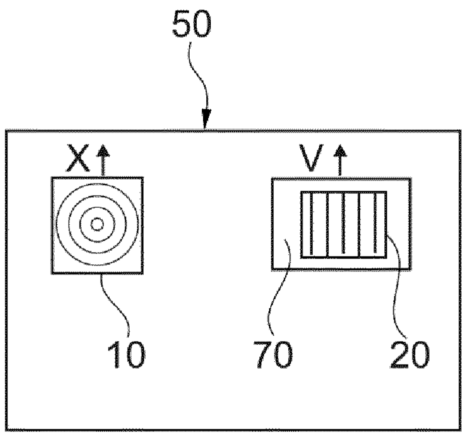
FIG. 12 represents one embodiment of a security-protected item, the first and second frames being carried by a window of the item.

Observation by Folding the Document or Superimposition of the Document and Another Object In a second embodiment depicted in FIG. 12 the security-protected item 50 includes a window 70, preferably at least partially transparent, in which the second frame 20 appears. The item 50 equally includes a first frame 10 applied to, for example printed on, the item 50, in particular copper plate printing, offset printing or metallization and/or removal of metallization. The zone in which the first frame 10 appears may equally be at least partially transparent.

Figure 14:
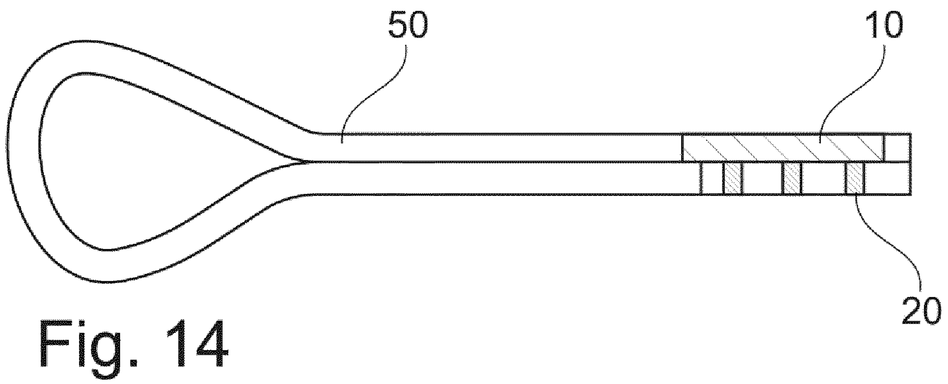
FIG. 14 represents the folded security-protected item.

To observe the revealed image 30 the user must therefore fold the security-protected item 50 as depicted in FIG. 14, to bring the second frame 20 over the first frame 10 so that their extension directions X and V are aligned and then observe the revealed image 30. The revealed image 30 therefore cannot be observed when the item 50 is not folded and action of the user is required, namely folding the security-protected item 50, to cause it to appear.

Figure 13:
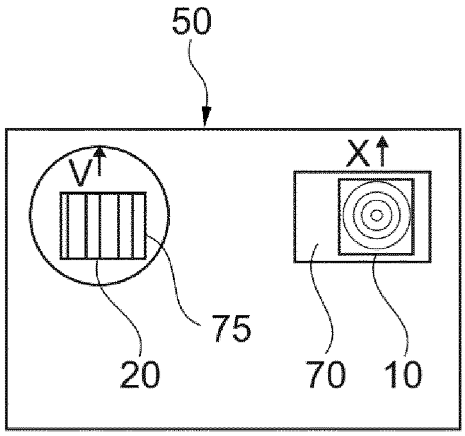
FIG. 13 represents one embodiment of a security-protected item, the first and second frames being carried by a window and a patch, respectively.

In FIG. 13 the security-protected item 50 includes a window 70, which is preferably at least partially transparent, in which the first frame 10 appears. The item 50 also includes a patch 75 including for example holographic printing in which the second frame 20 appears. The patch 75 may equally be at least partially transparent.

The patch 75 may include metallization and/or removal of metallization, for example consisting of aluminum, and the second frame 20 may include holographic printing and/or metallization and/or removal of metallization.

Figure 15:
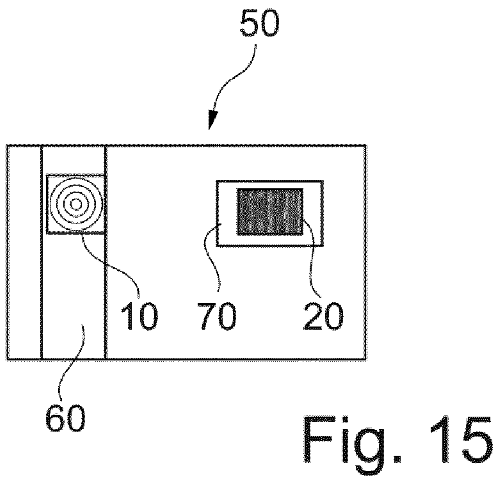
FIG. 15 represents a variant embodiment of a security-protected item, the first and/or second frames being carried by at least one security strip or a foil.

In FIG. 15 the item 50 includes a window 70, which is preferably at least partially transparent, in which the second frame 20 appears. The item 50 also includes a security strip 60 on which the first frame 10 appears. The security strip 60 may also be at least partially transparent or include a partially transparent zone at the level of the first frame 10.

There have been represented in FIGS. 16 to 20 other examples of security-protected items 50 according to the invention including first and second frames 10 and 20 carried by at least one security strip or a foil 60.

Figure 16:
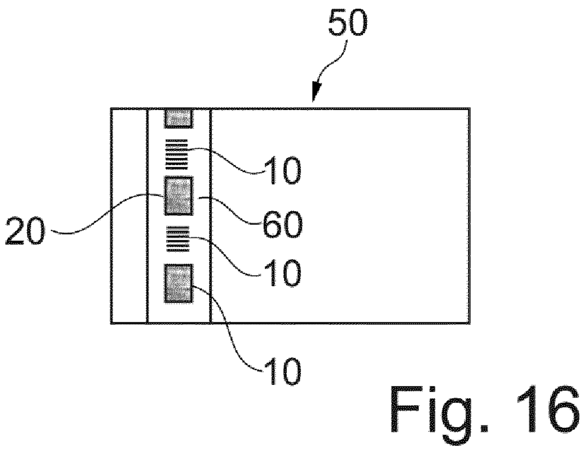
FIG. 16 represents a variant embodiment of a security-protected item, the first and/or second frames being carried by at least one security strip or a foil.

In FIG. 16 the item 50 includes a security strip 60 of sufficient width to show alternating first and second frames 10 and 20. The security strip 60 is advantageously at least partially transparent or has one or more at least partially transparent zones at the level of the first and/or second frame(s).

Figure 17:
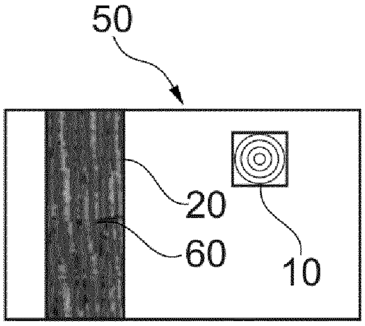
FIG. 17 represents a variant embodiment of a security-protected item, the first and/or second frames being carried by at least one security strip or a foil.

In FIG. 17 the item 50 includes a security strip 60 in which appears a second frame 20. The item 50 equally includes a first frame 10, for example in the form of offset printing on the item 50.

The security strip 60 may be at least partially transparent or include an at least partially transparent zone. The item 50 may equally include an at least partially transparent zone at the level of the first frame 10.

Figure 18:
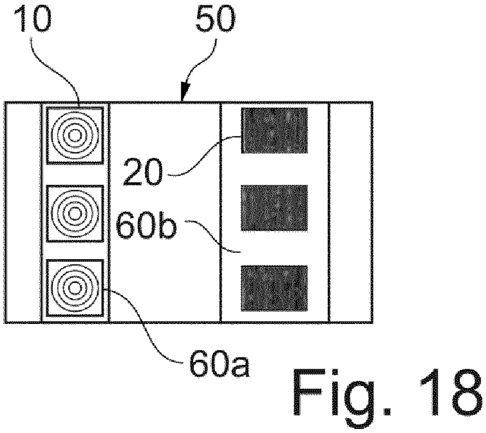
FIG. 18 represents a variant embodiment of a security-protected item, the first and/or second frames being carried by at least one security strip or a foil.

In FIG. 18 the item 50 includes two security strips **60*a* and 60*b*. The security strip 60*a* includes three first frames and the security strip 60*b* includes three second frames 20**.

The security strip **60*a* and/or the security strip 60*b* may be at least partially transparent or include at least one at least partially transparent zone, in particular at the level of a first frame 10 or a second frame 20**.

Figure 19:
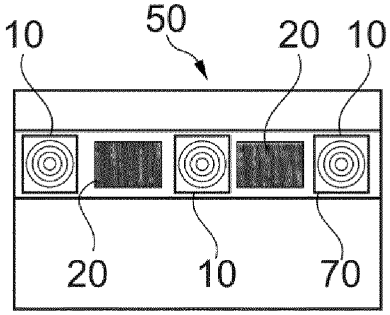
FIG. 19 represents a variant embodiment of a security-protected item, the first and/or second frames being carried by at least one security strip or a foil.

In FIG. 19 the item 50 includes a foil 70 on which there appear alternating first frames 10 and second frames 20.

The foil 70 may be at least partially transparent or include at least one at least partially transparent zone at the level of a first frame 10 and/or a second frame 20.

Figure 20:
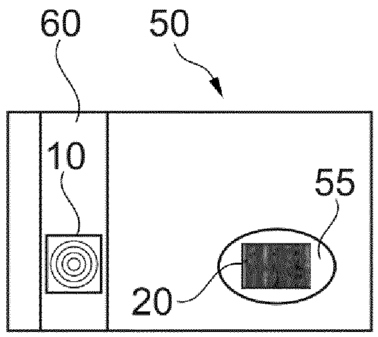
FIG. 20 represents a variant embodiment of a security-protected item, the first and/or second frames being carried by at least one security strip or a foil.

In FIG. 20 the item 50 includes a security strip 60 on which a first frame 10 appears. The item 50 equally includes a patch 55 that may include holographic or other metallization on which a second frame 20 appears.

The security strip 60 may be at least partially transparent or include an at least partially transparent zone at the level of the first frame 10.

The patch 55 may equally be at least partially transparent, in particular at the level of the second frame 20.

In all the examples described above the first and second frames 10 and 20 may be interchanged.

The at least partially transparent zones may be situated at the level of the first frames 10 and/or the second frames 20.

The security strip or strips 60, **60*a* and 60*b* may be introduced into the security-protected item 50** in a conventional manner, for example on the surface, within the material or in one or more windows.

The items 50 may be authenticated by folding them in the lengthwise or widthwise direction in such a manner as at least partially to superpose the first and second frames and then moving them relative to one another and/or modifying the angle of observation of the superimposed first or second frames, in such a manner as to see for example the illusion of a movement.

In a further variant it is equally possible to superpose at least partially the item 50 with another similar item, as described above.

Imaging Device

Figure 21:
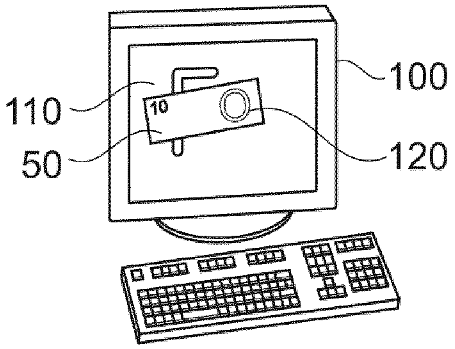
FIG. 21 represents a variant assembly including an electronic imaging device and an item.
Figure 22:
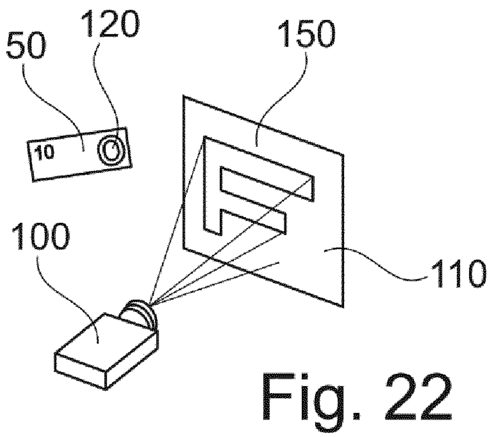
FIG. 22 represents a variant assembly including an electronic imaging device and an item.
Figure 23:
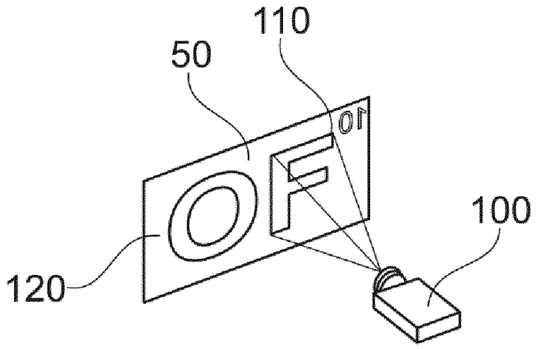
FIG. 23 represents a variant assembly including an electronic imaging device and an item.

There have been represented in FIGS. 21 to 23 examples of the association of a security-protected item 50 and an electronic imaging device 100 enabling the first or second frame 10 or 20 to be formed.

In FIG. 21 the electronic imaging device 100 is for example a computer screen on which is displayed a first image 110, the first image 110 being the first or second frame 10 or 20.

The security-protected item 50 for example takes the form of a banknote and includes a second image 120, the second image being the second frame 20 if the first image is the first frame 10 and vice versa.

The security-protected item 50 is placed on the screen of the electronic imaging device 100 in such a manner as to superpose at least partially the first image 110 and the second image 120 to observe the revealed image 30 and deduce therefrom information authenticating and/or identifying the security-protected item 50.

The security-protected item 50 may be moved relative to the screen of the electronic imaging device 100 or the observer may change the angle of observation to enable observation of a change in the revealed image 30.

Alternatively, the security-protected item 50 remains immobile relative to the screen of the electronic imaging device 100 and the first image 110 is animated to move on the screen, for example to move in translation, for example with the aid of a program that can be activated by the user.

In FIG. 22 the electronic imaging device 100 takes for example the form of a digital projector projecting a first image 110 onto a background 150, for example the wall of a room.

The security-protected item 50 including the second image 120 may then be at least partially superimposed on the first image 110 projected onto the background 150 to enable observation of the revealed image or images Ir.

In FIG. 23 the electronic imaging device 100 is a projector that projects the first image 110 directly onto the security-protected item 50.

As in the FIG. 21 example the first image 110 may be projected, for example in the form of an “F”, onto a zone of the security-protected item 50 where the second image 120 is not present. The security-protected item 50 is then folded on itself, for example in such a manner as to superimpose the second image 120, for example in the form of an “O”, on the first image 110 projected by the electronic imaging device 100. The part of the security-protected item 50 including the second image 120 may in particular be disposed on the part including the first image 110, that part remaining immobile, in such a manner that the first image 110 is situated between the imaging device 100 and the second image 120.

In a variant represented in FIG. 23 the first image 110 is projected directly onto the second image 120 on the item 50. In particular, projecting the first image 110 onto the second image 120 on the item 50 can enable at least partial superimposition of the first and second images. The electronic imaging device 100 can then be moved relative to the article 50 to move the second frame 20 relative to the first frame 10.

Figure 24:
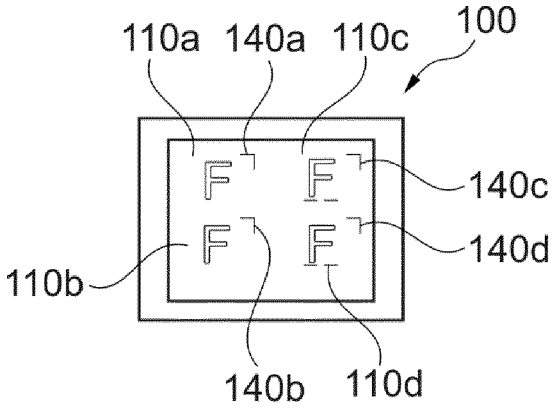
FIG. 24 represents variant first images formed by an electronic imaging device.

There has been represented in FIG. 24 a variant embodiment in which the electronic imaging device 100 is a screen displaying a plurality of first images 110*a*, 110*b*, 110*c* and 110*d*.

The first images 110*a* to 110*d* may have different properties, for example different shapes, colors, dimensions, first and/or second patterns of first and/or second frames.

The first images 110*a* to 110*d* are advantageously different in such a manner as to enable one of them at least to be associated with at least one second image 120 present on an item 50. As a result it is for example possible to authenticate and/or identify a greater diversity of items 50 having respective different images corresponding to the different first images 110*a* to 110*d*.

Alternatively, the item 50 includes a plurality of different second images 120 and the electronic imaging device 100 produces one or more first images 110. As a result it is possible to authenticate and/or identify a given security-protected item 50 across a greater diversity of different electronic imaging devices, and in particular electronic imaging devices having different resolutions. As a result the aforementioned two advantages can be combined.

The electronic imaging device 100 can display one or more indicators 140*a*, 140*b*, 140*c* and 140*d* enabling the user to be advised of how to position the item 50 represented in FIG. 24 relative to the imaging device.

In particular, the indicators 140*a* to 140*d* may make it possible to tell where to position the top right-hand corner of the item 50 in such a manner as correctly to superpose a second image 120 of an item 50 on a first image 110*a*, 110*b*, 110*c* or 110*d* displayed on the screen of the electronic imaging device 100.

Figure 25:
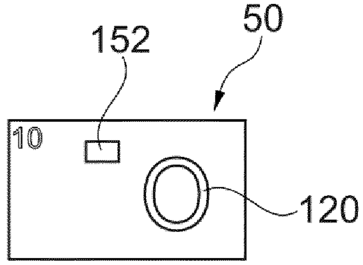
FIG. 25 represents a variant item including an integrated microcircuit.

As depicted in FIG. 25 the item 50 may include an integrated microcircuit 152, for example a RFID or an optical chip, enabling communication with the electronic imaging device 100 in order to command the display of an indicator as described above or to give information on how to position the first and second images.

Alternatively, the chip 152 is able to communicate with the electronic imaging device 100 to enable production of the first image 110 associated with the second image 120.

In particular, during the process of authenticating and/or identifying the item 50, the second image 120 is illuminated by the electronic imaging device 100. The chip 152 includes information transmitted to the electronic imaging device 100 which then projects or displays the first image 110 as a function of that information.

The item 50, in particular the second image 120, may be photographed and/or filmed by a digital video camera that is part of or connected to the electronic imaging device 100. A recognition program can then enable recognition of the second image 120 and acquisition from a database of a first image 110 associated with the second image 120. The database is for example stored on a secure server. The first image 110 obtained in this way is displayed and/or projected by the electronic imaging device 110 to enable authentication and/or identification of the item 50.

Figure 26:
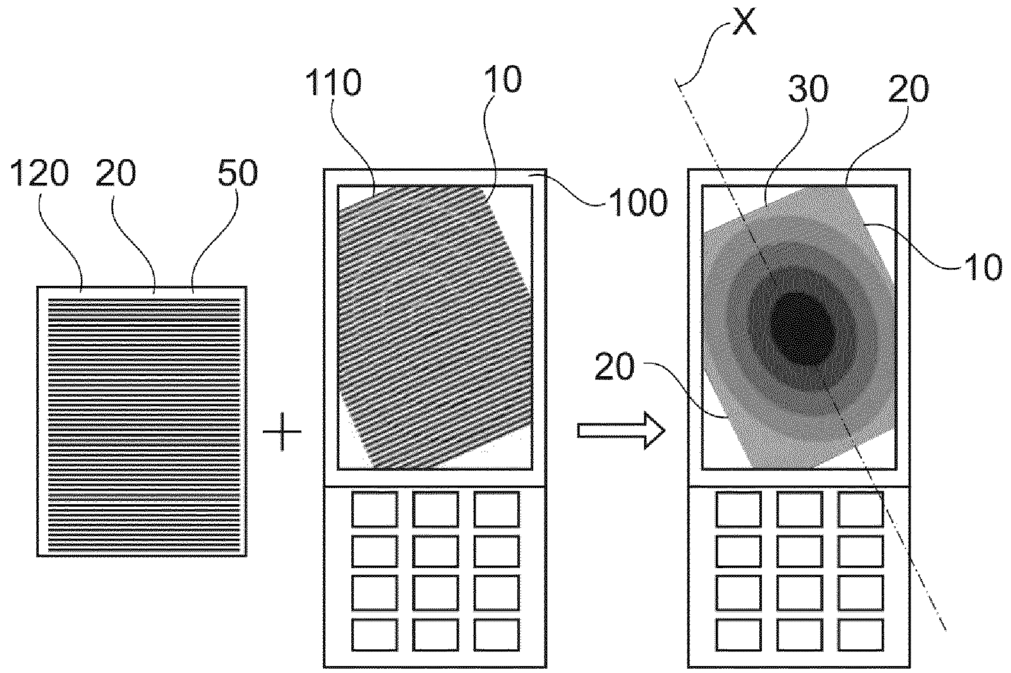
FIG. 26 represents a variant assembly, the item including a second image in the form of a second frame and the electronic imaging device producing a first image in the form of a first frame.

In the variant depicted in FIG. 26 the electronic imaging device 100 takes the form of a mobile telephone on which is displayed a first image 110 in the form of a first frame 10. The item 50 includes a polarizing filter on which the second image 120 has been formed in the form of a second frame 20. The item 50 including the second image 120 in the form of a second frame 20 is superimposed on the first image 110 in the form of a first frame 10 produced by the electronic imaging device 100, the latter emitting polarized light and aligning the extension directions of the first and second frames 10 and 20.

The item 50 including the second frame 20 may be moved in translation relative to the first frame 10 displayed on the screen of the electronic imaging device 100 so as to cause the revealed image 30 to change.

In a variant that is not depicted the item 50 including the second frame 20 may be immobile and the imaging device may display a mobile first frame 10 on the screen with a movement in translation in the direction corresponding to the extension direction of the corresponding frame, so as to cause the revealed image 30 to change.

A method of this kind enables authentication and/or identification of the security-protected item 50 with a plurality of levels of security.

A first level of security is achieved by positioning the second frame 20 including the polarizing filter depending on the orientation enabling observation of the opacity of the polarizing filter, this observation being visible only on a screen emitting polarized light, for example an LCD type screen.

Revelation of the animation of the revealed image 30 by movement of the second frame 20 relative to the first frame 10 achieves a second level of security.

In a further variant the electronic imaging device 100 is a screen, in particular of LCD type, including a plurality of pixels preferably forming a first frame, for example as shown in FIG. 21.

Variants

Figure 27:
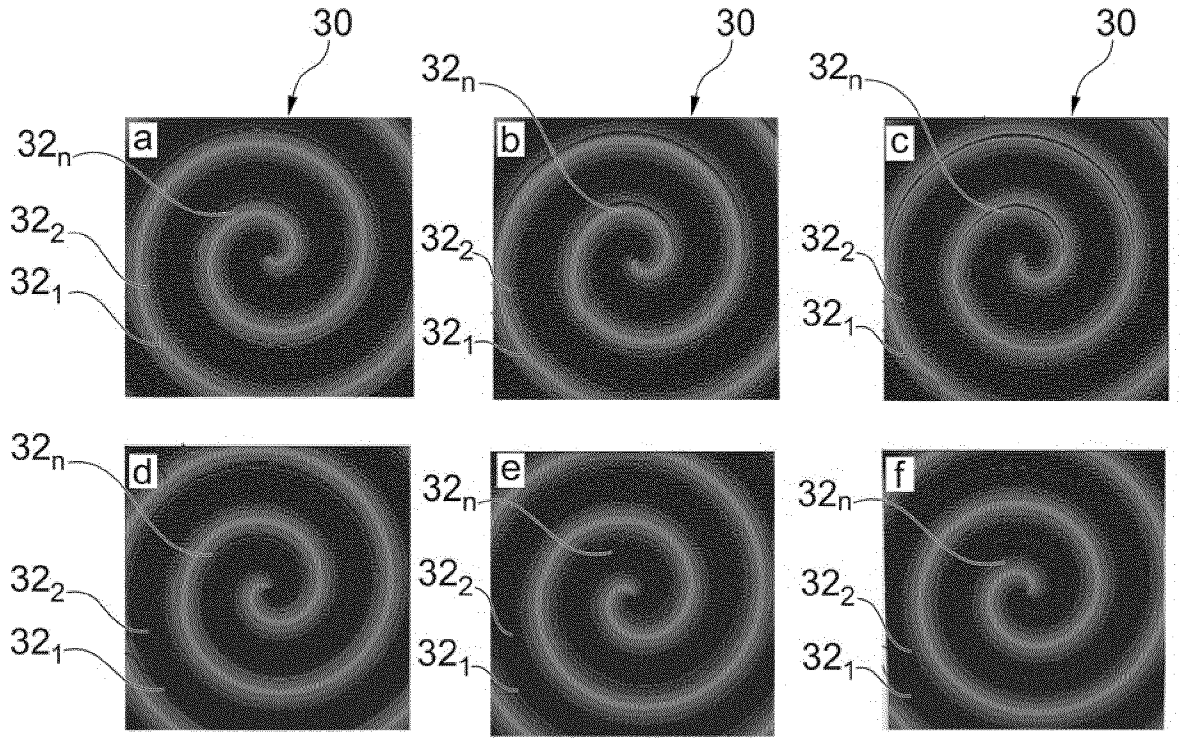
FIG. 27 is a variant of revealed images obtained at different relative positions of the first and second frames.
Figure 28:
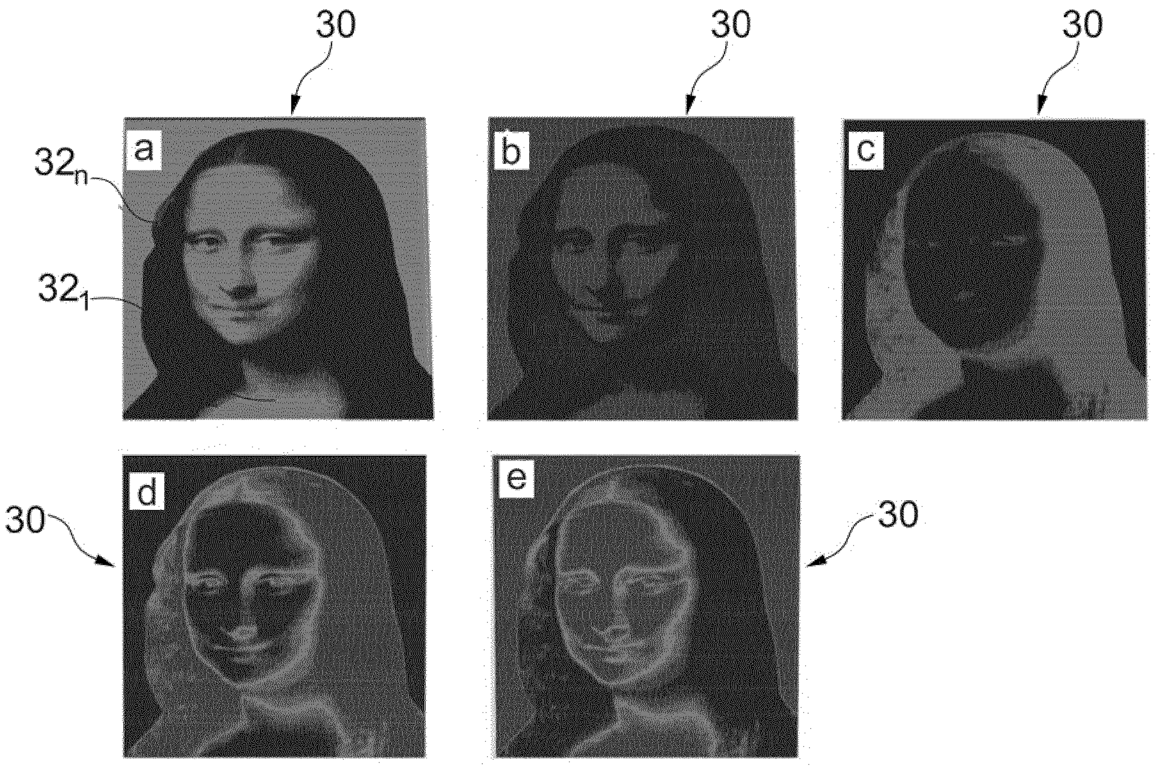
FIG. 28 is a variant of revealed images obtained at different relative positions of the first and second frames.

The embodiment of FIGS. 27 and 28 differ from the preceding embodiments in the shape of the first frame sub-frames.

As depicted in FIG. 27 the n sub-frames $\mathbf{12}_1$ to 12*n* have contours in the form of concentric spirals so as to form revealed sub-images $\mathbf{32}_1$ to 32*n* in the form of concentric spirals in different shades of gray. The n sub-frames $\mathbf{12}_1$ to 12*n* are successively phase shifted by a small phase shift m substantially equal to $(x_1+x_2)/n$ and $x_1$ and $v_1$ are substantially equal to $(x_1+x_2)/2$. The relative movement between the two frames 10 and 20 produces an effect of movement of the spiral giving the impression that it is winding up on itself, each tone being moved from one sub-image to an adjacent sub-image during the movement of the two frames 10 and 20 relative to one another, as can be seen in FIG. 27, images a to f.

In the FIG. 28 variant the revealed image 30 may form any graduated image between two tones, in particular shades of gray. In the example depicted in this figure the sub-frames $\mathbf{12}_1$ to $\mathbf{12}_n$ have contours configured to form a revealed image 30 representing the portrait of Mona Lisa in different shades of gray, as can be clearly seen in FIG. 28, image a. Relative movement between the two frames 10 and 20, as depicted in FIG. 28, images a to e, generates a change of the gray shades of different revealed sub-images as described above and the portrait of Mona Lisa changes, in particular vis a step of the portrait being in negative form as depicted in FIG. 28, image c.

The embodiments of FIGS. 29 to 34 differ from the preceding embodiments in the color of the first and second lines of the first and second frames.

Figure 29:
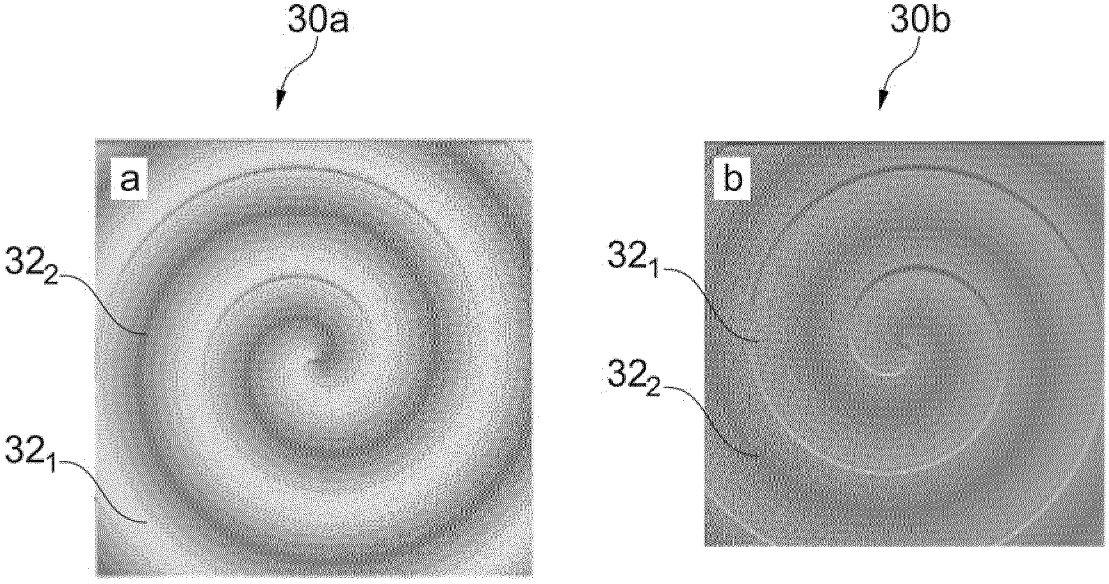
FIG. 29 is a variant of revealed images obtained by observation from the side of the first and second frames.

In the FIG. 29 variant the first frame first elementary patterns 14 are the same opaque magenta color, the second frame first elementary patterns 24 are of opaque cyan color, and the first and second frame second elementary images 16 are uniformly transparent. The background is white. The sub-frames $12_1$ to $12_n$ have the same contours as in FIG. 27. If the superimposed first and second frames 10 and 20 are observed with the extension directions X and V aligned, from the side of the second frame 20, as depicted in FIG. 29, image a, a revealed image 30*a* is visible. In this revealed image 30*a* the revealed sub-images respectively assume the colors of a graduated spectrum between light cyan, a 50/50 mixture of the cyan of the second frame first elementary patterns 24 and the background when the second frame first elementary patterns 24 totally block the first frame first elementary patterns 14, visible at the level of the revealed sub-image $32_1$, and blue-violet, a 50/50 mixture of magenta and cyan when the first frame first elementary patterns 14 are totally visible through the second frame second elementary patterns 26, visible at the level of the revealed sub-image $32_2$. If the item 50 is observed from the side of the first frame 10, as depicted in FIG. 29, image b, a revealed image 30*b* is visible. In this revealed image 30*b* the revealed sub-images respectively assume the colors of a graduated spectrum between light magenta, a 50/50 mixture of the magenta of first frame first elementary patterns 14 and the white of the background when the first frame first elementary patterns 14 totally block the first frame first elementary patterns 14, visible at the level of the revealed sub-image $32_1$, and the preceding blue-violet, visible at the level of the revealed sub-image $32_2$. The revealed image 30 is therefore different colors depending on whether it is observed from the side of the first or second frame.

Figure 30:
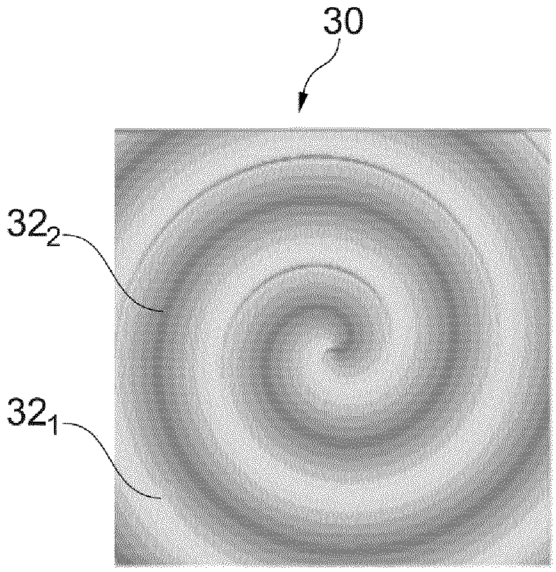
FIG. 30 is a variant of a revealed image.

In the FIG. 30 variant the first frame first elementary patterns 14 are of opaque magenta color, the second frame first elementary patterns 24 are of opaque cyan color, the first frame second elementary patterns are of opaque yellow color and the second frame second elementary patterns 16 are uniformly transparent. The sub-frames have the same contours as in FIG. 27. The revealed image can be observed only from the side of the second frame 20. If the first and second frames 10 and 20 are superimposed with extension directions X and V aligned and the item 50 is observed from the side of the second frame 20, as depicted in FIG. 30, the revealed sub-images take the form of a color spectrum graduated between green, a 50/50 mixture of the cyan of the second frame first elementary patterns 24 and the yellow of the first frame second elementary patterns 16 if the second frame first elementary patterns 24 completely block the first frame first elementary patterns 14, visible at the level of the revealed sub-image $32_1$ and the preceding blue-violet, visible at the level of the revealed sub-image $32_2$.

Thus any graduation of colors between two particular colors is possible by careful choice of the colors of the various first and second frame elementary patterns. It is equally possible to choose the opacity of the elementary patterns appropriately to give different effects.

Figure 31:
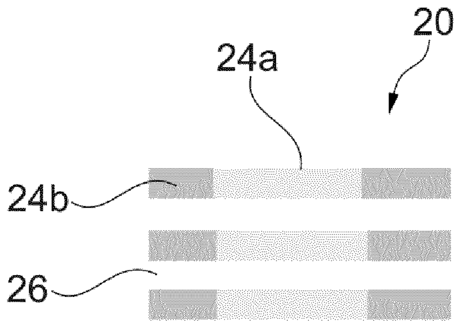
FIG. 31 is a detail of a variant second frame.
Figure 32:
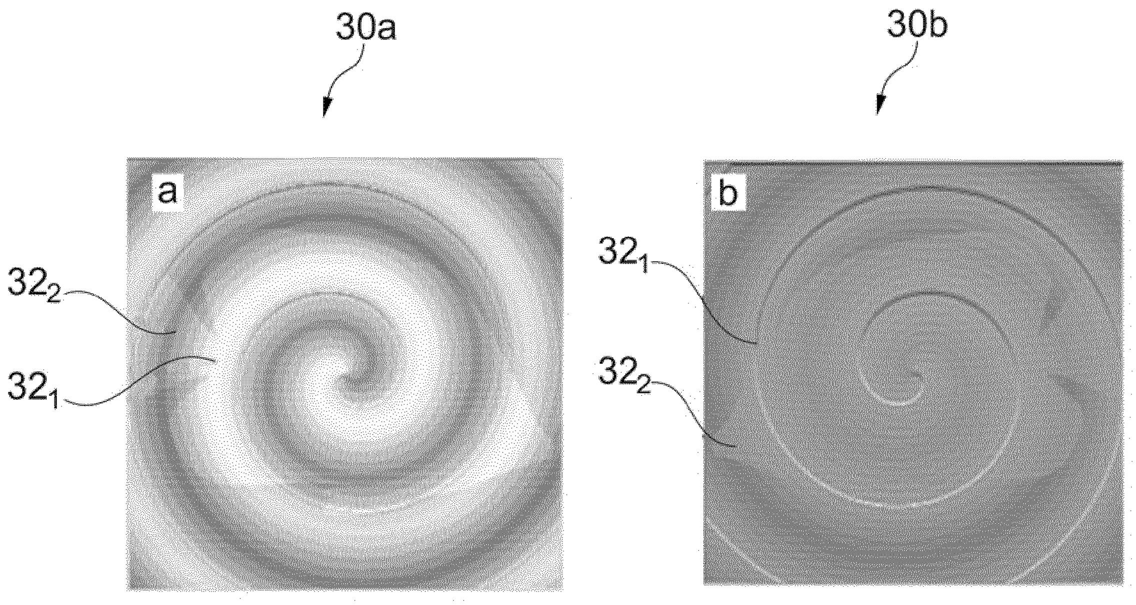
FIG. 32 is a variant of revealed images obtained by observation from the side of the first and second frames.

In the variant depicted in FIGS. 31 and 32 the first frame 10 is identical to that of the FIG. 29 embodiment and the second frame first elementary patterns 24 have portions 24*a* of their length yellow in color and portions 24*b* of their length cyan in color as can be seen in FIG. 31. If the second frame 20 is observed on its own, the observer then sees a light yellow fish on a light cyan background. If the superimposed first and second frames 10 and 20 are observed with the extension directions X and V aligned the portions of the revealed image at the level of the cyan portions of the second frame first elementary patterns 24*b* are identical to that of the FIG. 29 embodiment described above. At the level of the yellow second frame first elementary patterns 24*a*, by observation from the side of the second frame 20, as can be seen in FIG. 32, image a, the fish pattern is found in the revealed image 30*a* with a graduated spiral running from yellow, when the yellow portions of the second frame first elementary patterns 24*a* completely block the first frame first elementary patterns 14, visible at the level of the revealed sub-image $32_1$, to red, a 50/50 mixture of yellow and magenta when the first frame first elementary patterns 14 are completely visible through the second frame second elementary patterns 26 visible at the level of the revealed sub-image $32_2$. The contour of the fish pattern is clearly visible and the spiral appears to be inside the fish with different colors inside and outside the fish. By observation from the side of the first frame 10, as can be seen in FIG. 32, image b, if the first frame first elementary patterns 14 completely block the second frame first elementary patterns 24 the contours of the portions of the yellow second frame first elementary patterns 24*a* are not visible and the fish pattern is not visible, only a magenta spiral appearing, as can be seen at the level of the sub-image $32_1$ in FIG. 32, image a, and if the second frame first elementary patterns 24 are completely visible through the first frame second elementary patterns 16 the contours of the portions of the yellow second frame first elementary patterns 24*a* are visible, the parts corresponding to the fish appearing red, exactly as before, as can be seen at the level of the sub-image $32_2$ in FIG. 32, image a. In the revealed image 30*b* the fish shape appears to be in the background, a magenta spiral appearing on the fish. In this case the revealed images 30*a* and 30*b* are different colors and different patterns depending on whether the superimposition of the two frames is observed from the side of the first or second frame.

Figure 33:
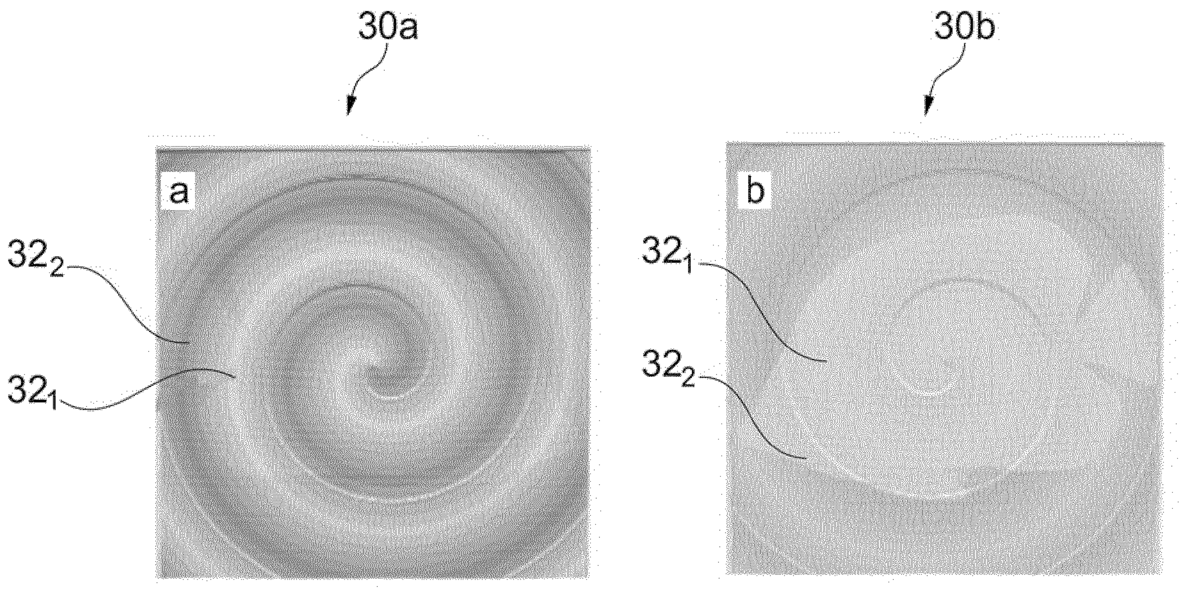
FIG. 33 is a variant of revealed images obtained by observation from the side of the first and second frames.

The FIG. 33 embodiment differs from that in FIGS. 31 and 32 in that the first and second frame first elementary patterns 14 and 24 are partially transparent. The image revealed by observation of the two superimposed frames from the side of the second frame 30*a* has at the level of the cyan second frame first elementary patterns 24*b* a spiral featuring a graduation between violet and light cyan and at the level of the yellow second frame first elementary patterns 24*a* a spiral featuring a graduation between red and light yellow. The fish pattern is clearly apparent at the level of each of the sub-images of the revealed image 30*a*. The image revealed by observation from the side of the first frame 30*b* has at the level of the cyan second frame first elementary patterns 24*b* a spiral featuring a graduation between blue and pink and at the level of the yellow second frame first elementary patterns 24*a* a spiral featuring a graduation between yellow and pink. The fish pattern clearly observable at the level of the yellow revealed sub-images $32_2$ is less visible at the level of the pink revealed sub-images $32_1$.

Figure 34:
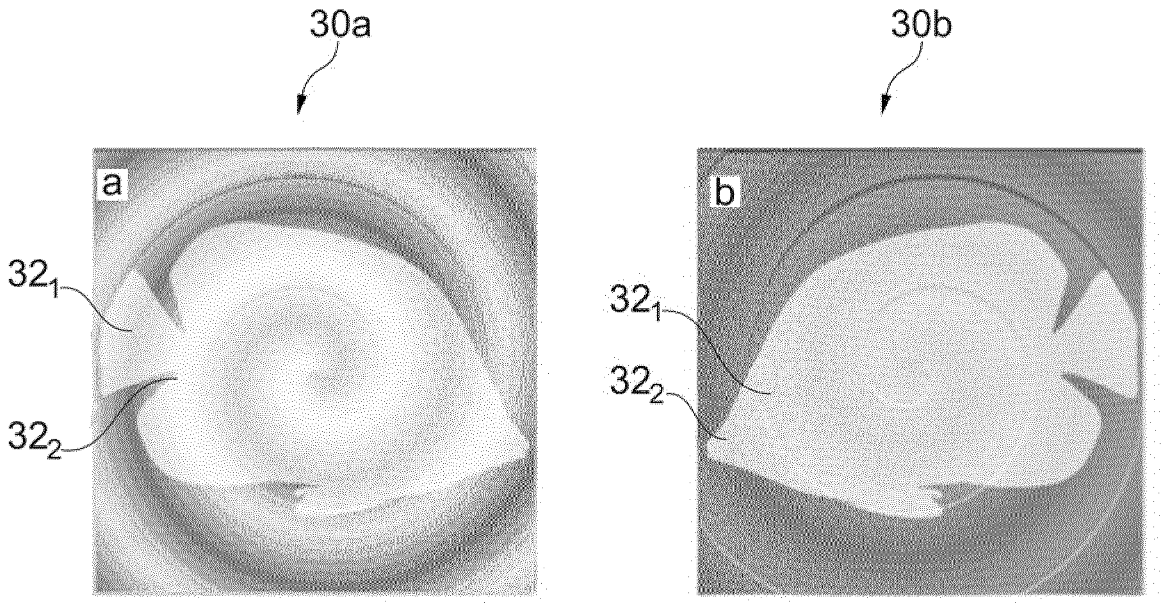
FIG. 34 is a variant of revealed images obtained by observation from the side of the first and second frames.

The FIG. 34 embodiment differs from that from FIGS. 31 and 32 in that the first frame first elementary patterns 14 have portions of their length cyan in color and portions of their length magenta in color forming the same fish pattern as the second frame 20. If the two frames are superimposed so that the extension directions X and V of the frames are aligned and the fishes of the two frames are substantially aligned, the image 30*a* revealed by observation on the side of the second frame features, at the level of the cyan second frame first elementary patterns 24*b* a spiral featuring a graduation between blue-violet and light cyan and at the level of the yellow second frame first elementary patterns 24*a* a spiral featuring a graduation between green at the level of the revealed sub-image $32_1$ and light yellow at the level of the revealed sub-image $32_2$. The fish pattern appears clearly at the level of each of the sub-images of the revealed image 30*a*. The image revealed on observation from the side of the first frame 30*b* features at the level of the cyan second frame first elementary patterns 24*b* a spiral featuring a graduation between blue and pink and at the level of the yellow second frame first elementary patterns 24*a* a spiral featuring a graduation between light cyan at the level of the revealed sub-image $\mathbf{32}_1$ and green at the level of the revealed sub-image $\mathbf{32}_2$. The fish pattern can be observed by observation from either side of the item. This embodiment necessitates good positioning of the two frames relative to one another so that the fish patterns of the first and second frames are substantially superimposed.

Figure 37A:
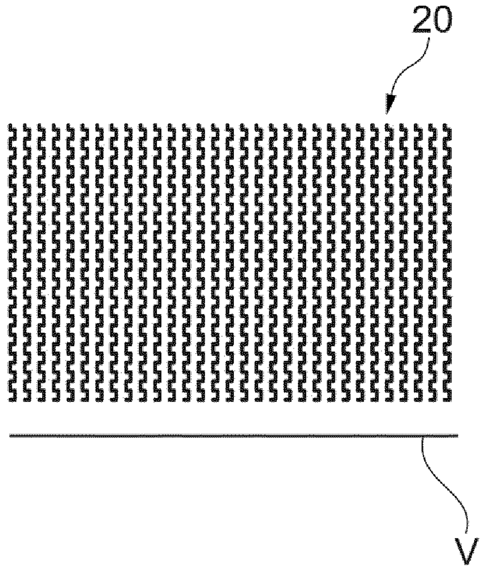
FIG. 37A is a variant second frame.
Figure 37B:
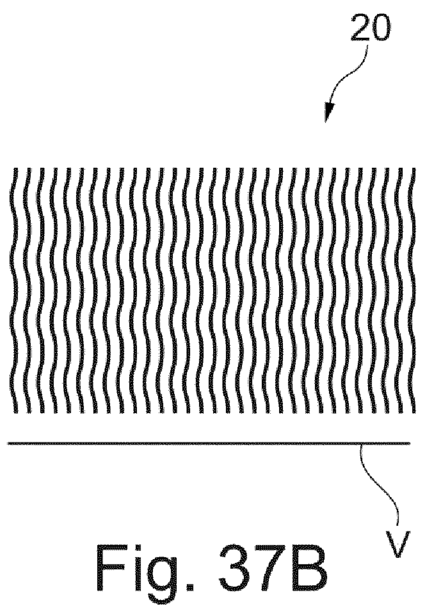
FIG. 37B is a variant second frame.

In the example depicted the first frame first and second lines 14 and 16 and the second frame first and second lines 24 and 26 have parallel rectilinear edges, but this may be otherwise. The second frame 20 may include other patterns such as crenelations or corrugations, as depicted in FIGS. 37A and 37B respectively.

Figure 35:
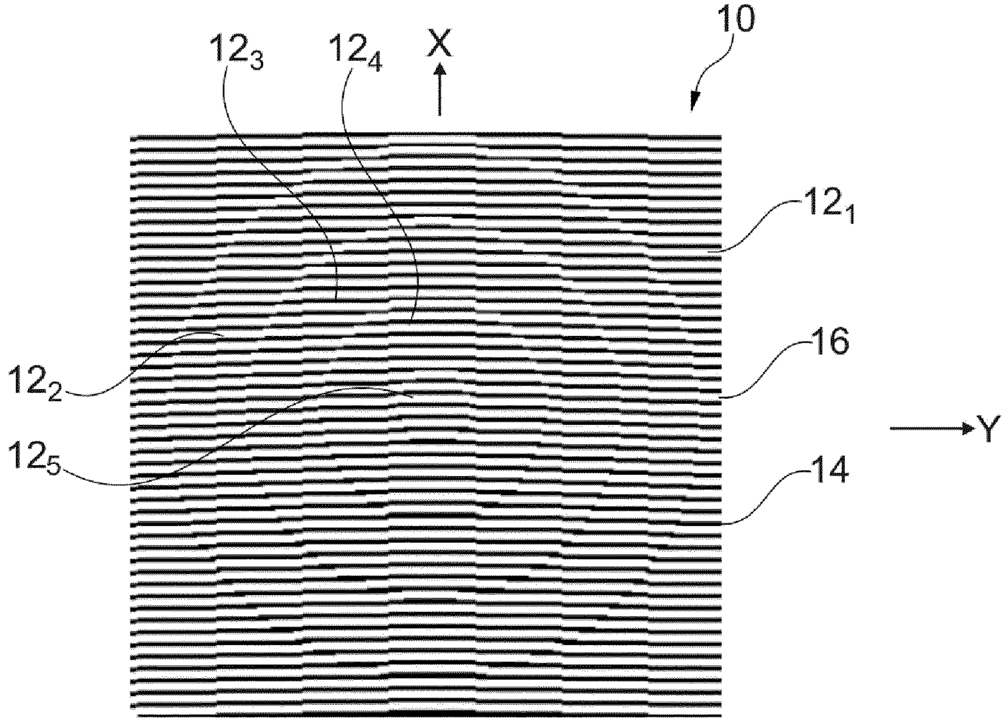
FIG. 35 is a variant first frame.
Figure 36:
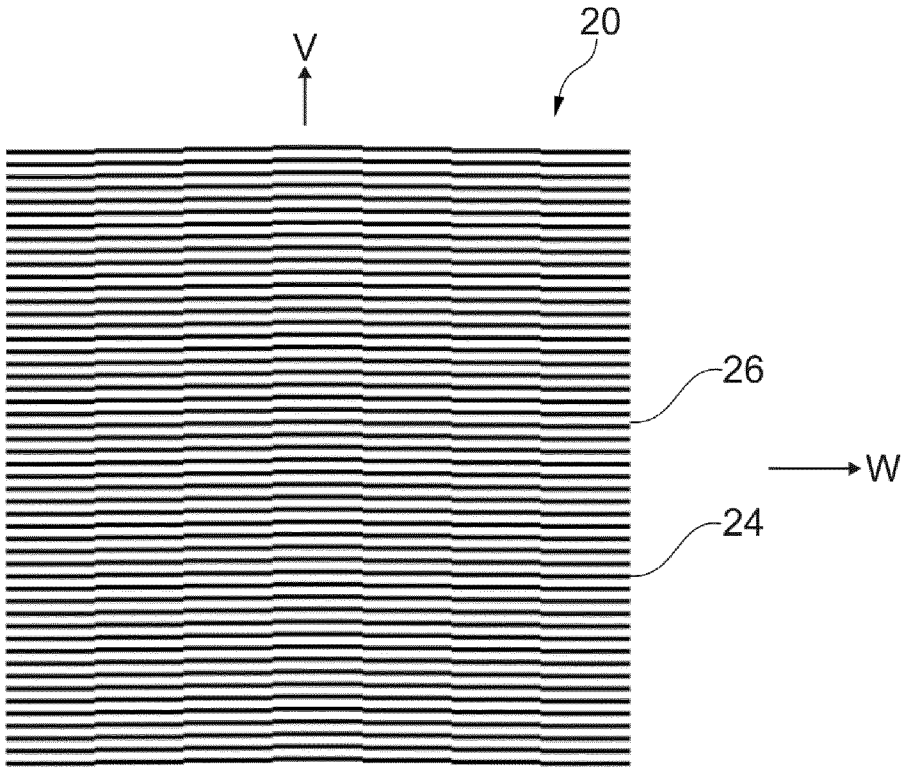
FIG. 36 is a variant second frame corresponding to the first frame from FIG. 35.

The embodiment from FIGS. 35 and 36 differs from the preceding ones in that the first and second frame lines are not rectilinear but stepped.

Figure 38:
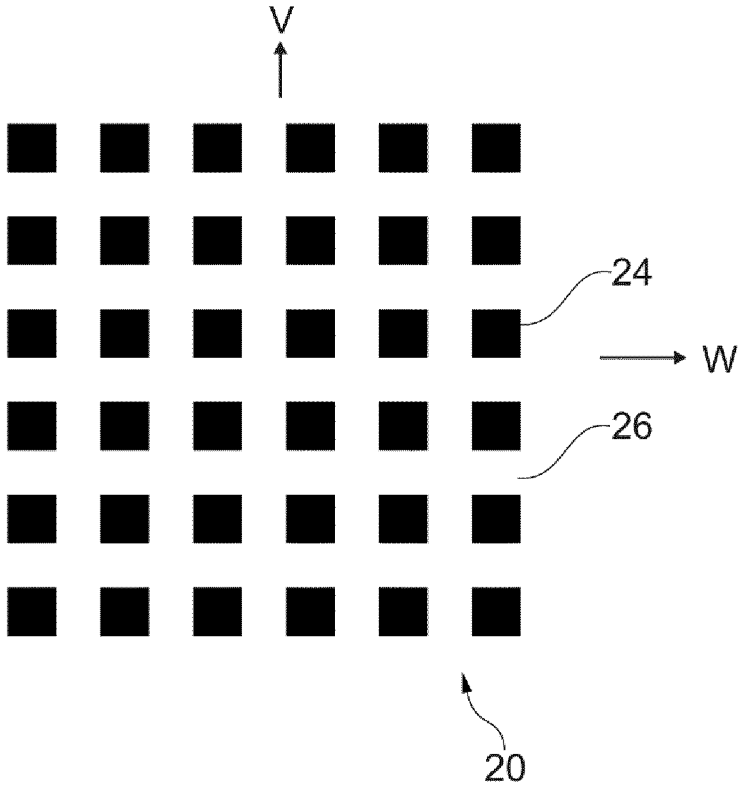
FIG. 38 is a variant second frame.
Figure 39:
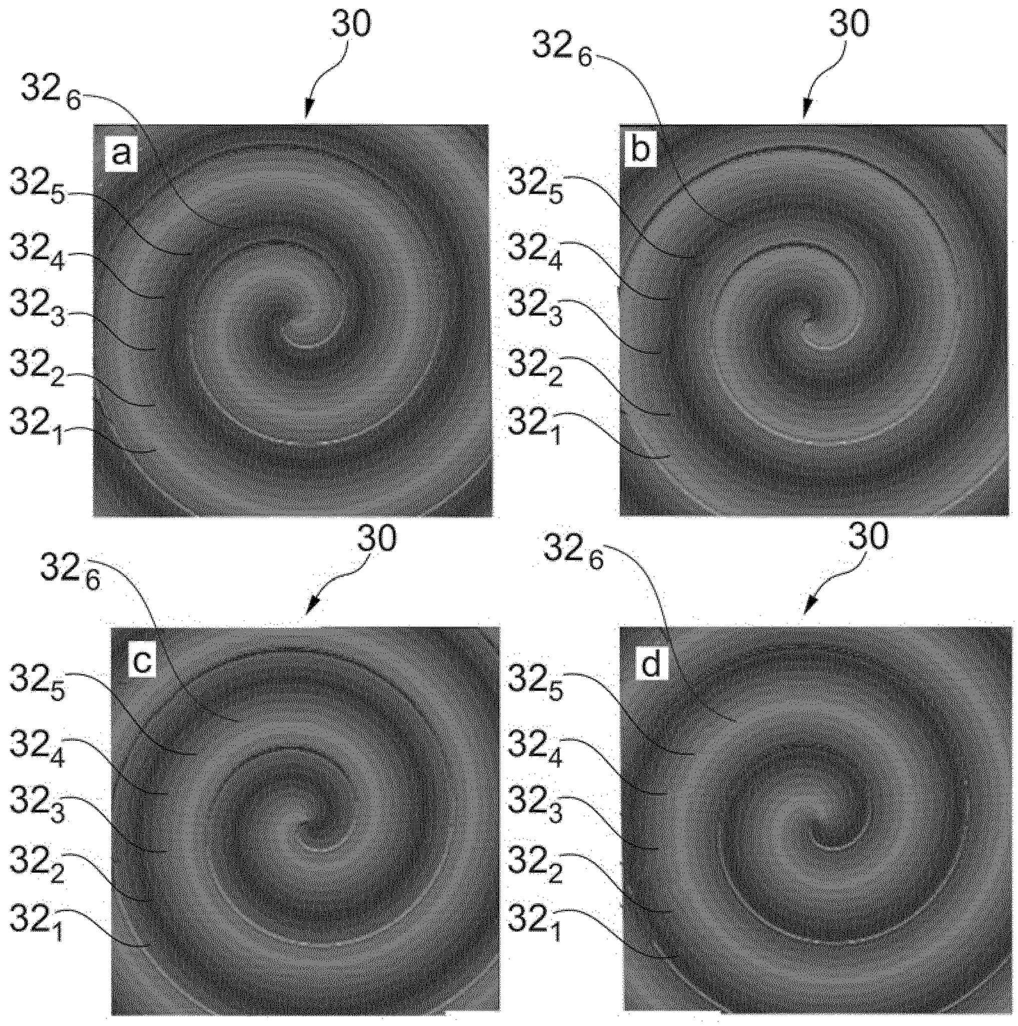
FIG. 39 is a variant of revealed images obtained by superimposition of the first frame from FIG. 27 and the second frame from FIG. 38.

In the variant depicted in FIGS. 38 and 39 the second frame first patterns 20 are in the form of pixels repeating in two mutually orthogonal extension directions V and W. The pixels are square in shape but this could be otherwise. For example, the pixels could be of another polygonal shape, in particular rectangular, hexagonal or lozenge shape. The images 30 revealed at different positions in the two FIG. 39 frames have been obtained by superimposition of the second frame 20 from FIG. 38 with the first frame from FIG. 27 with the extension directions X and V aligned. The revealed images 30 in FIG. 39 are lighter than the revealed images 30 in FIG. 27, but the effect obtained is otherwise exactly the same.

Figure 40:
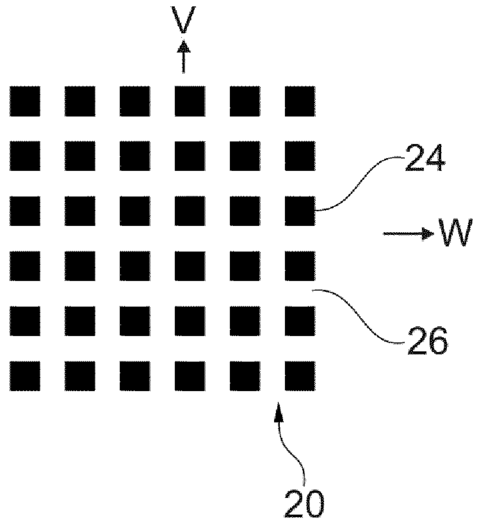
FIG. 40 is a detail of a variant second frame.
Figure 41:
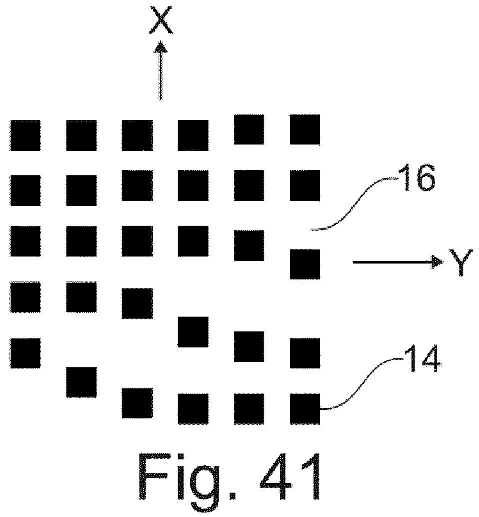
FIG. 41 is a detail of a variant first frame.

In the variant depicted in FIGS. 40 to 43 the second frame first patterns 20 take the form of pixels repeating in two mutually orthogonal extension directions V and W, as depicted in FIG. 40, and the first frame first patterns 10 take the form of pixels repeating in two mutually orthogonal directions X and Y, as depicted in FIG. 41. The first frame sub-frames are phase shifted only in the extension direction X. The pixels are square in shape but this could be otherwise. For example, the pixels could have another polygonal shape, in particular a rectangular, hexagonal or lozenge shape.

Figure 42:
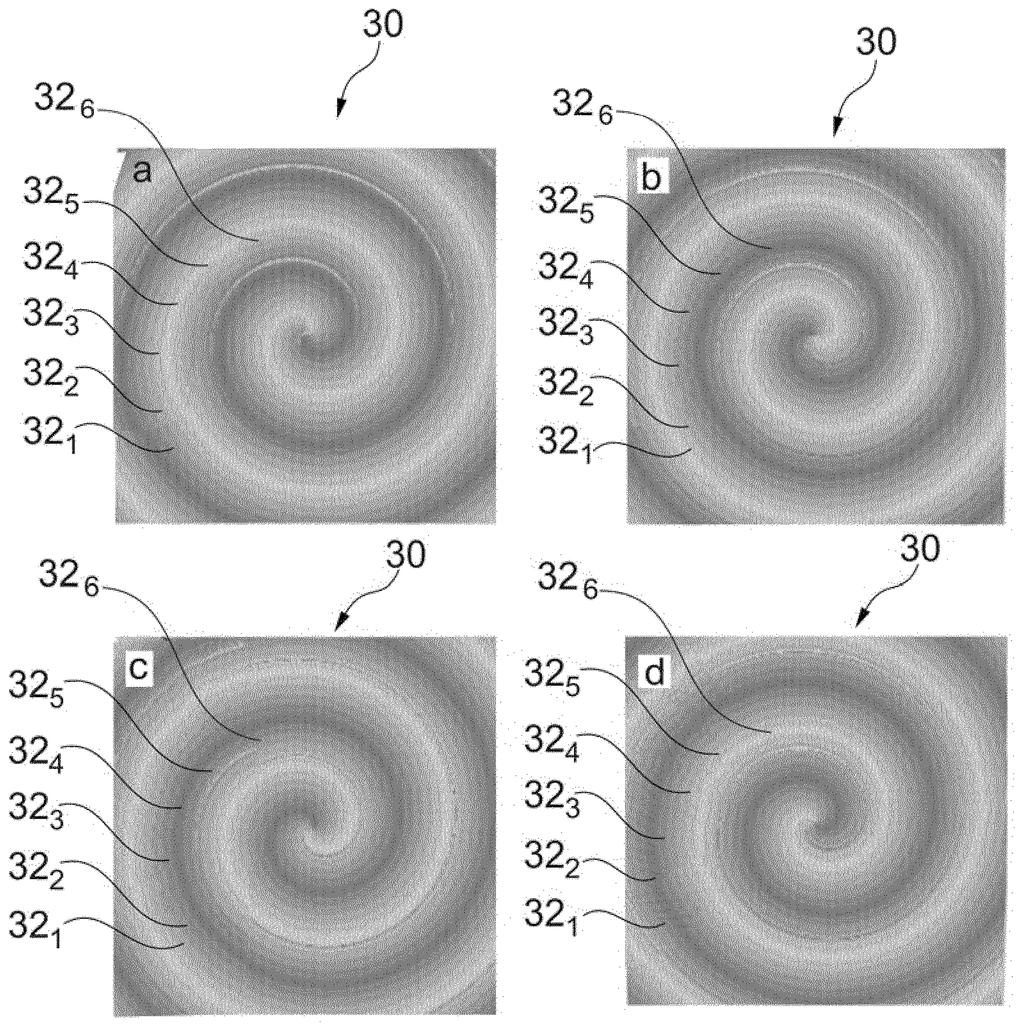

The revealed images 30 visible in FIG. 42 were obtained by superimposition of the second frame 20 from which FIG. 40 was obtained with the first frame from which FIG. 41 was obtained, the sub-frames of which are configured to have a pattern similar to that from FIG. 27 by aligning the extension directions X and V and moving the two frames 10 and 20 relative to one another in the extension direction X. On movement of the frames relative to one another in the extension direction X the spiral seems to turn on itself, as can be seen in FIG. 42, images a to d.

The revealed images 30 in FIG. 42 are lighter than the revealed images 30 in FIG. 39. However, the movement effect obtained is exactly the same.

Figure 43:
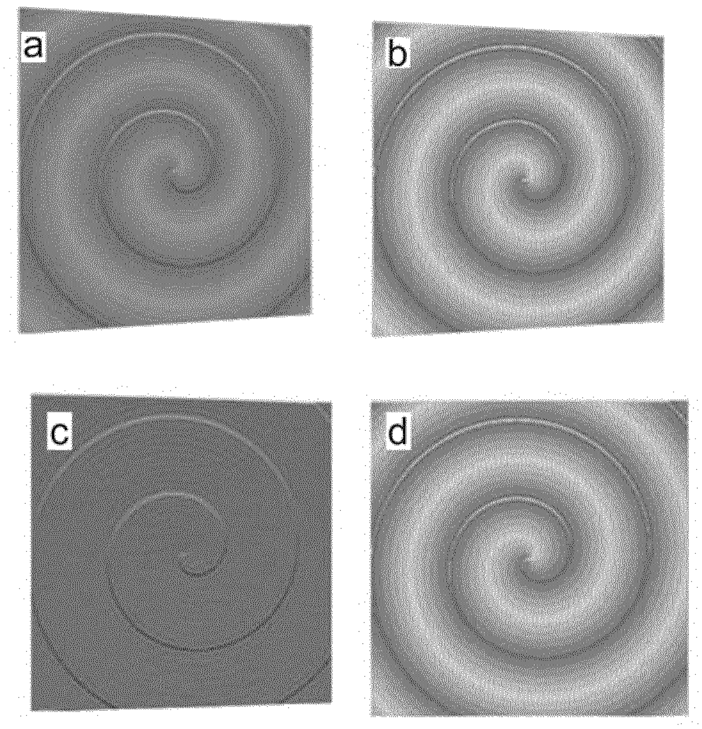

The revealed images 30 in FIG. 43 were obtained by moving the two frames 10 and 20 relative to one another in the extension direction Y. During the movement of the frames relative to one another in the extension direction Y the spiral does not seem to move but the contrast of the revealed image 30 changes, as can be seen in FIG. 43, images a to d.

Figure 44:
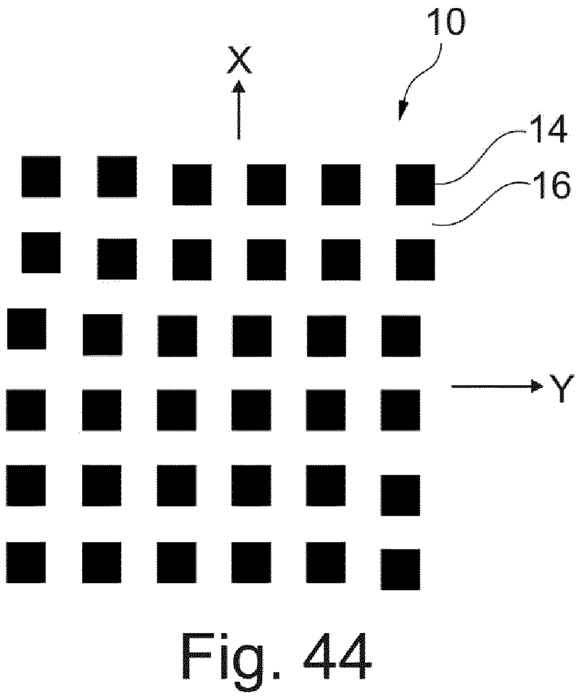
FIG. 44 is a detail of a variant of first frame.
Figure 45:
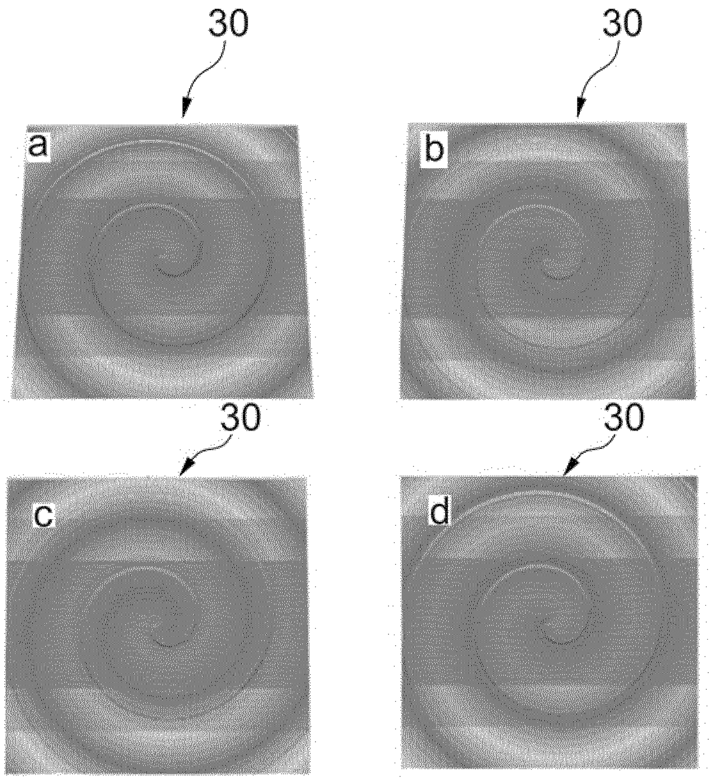
Figure 46:
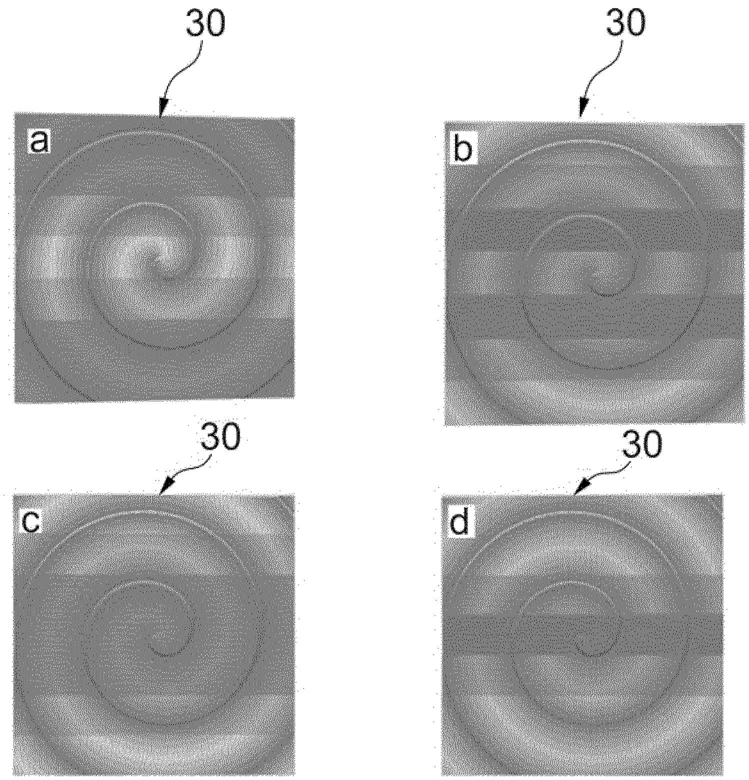

The variant depicted in FIGS. 44 to 46 differs from that depicted in FIGS. 40 to 43 in that the first frame includes at least n first frame sub-frames phase shifted relative to one another in the extension direction X, the n successive sub-frames being phase shifted by the same distance and forming a spiral pattern, and at least p first frame sub-frames phase shifted relative to one another in the extension direction Y, the p successive sub-frames being phase shifted by the same distance and forming horizontal stripes. The revealed images 30 in FIG. 45 were obtained by superimposition of the second frame 20 from which FIG. 40 was obtained with the first frame from which FIG. 44 was obtained as described hereinabove by aligning the extension directions X and V and moving the two frames 10 and 20 relative to one another in the extension direction X. During the movement of the frames relative to one another in the extension direction X the spiral appears to turn on itself and the horizontal strips change contrast but do not appear to move.

The revealed images 30 in FIG. 46 were obtained by moving the two frames 10 and 20 relative to one another in the extension directions Y and W. During the movement of the frames relative to one another in the extension direction Y the spiral does not appear to move but its contrast changes and the horizontal stripes change tone relative to one another giving the impression of a vertical strip moving vertically.

Figure 47:
FIG. 47 is a detail of a variant first frame.

In a further variant depicted in FIG. 47 the first frame first lines 14 of the n sub-frames $\mathbf{12}_1$ to $\mathbf{12}_4$ include micropatterns 7 and even better are formed by micropatterns 7. The micropatterns 7 preferably have a height $x_1$ in the first lines 14 and a width of the same order of magnitude so that, given the resolution, the lines 14 appear to the eye as uniform in color, the micropatterns 7 not being perceptible to the naked eye at a distance of 25 cm. The user must for example use a magnifying glass to view the micropatterns 7, which strengthens the security of the item. In the example depicted, only the first lines 14 include micropatterns 7 but this could be otherwise, and the second lines 16 can also include micropatterns 7 identical or not to those of the first lines or the second lines 16 may include micropatterns 7 while the first lines 14 do not.

The micropatterns 7 may be positive or negative patterns.

The micropatterns 7 may represent alphanumeric symbols, digits, text, geometrical shapes, objects, persons or animals.

Micropatterns 7 of this kind enable the security of the item 10 to be strengthened because they form additional security elements hidden in the first lines 14 and/or second lines 16 that cannot be seen by the naked eye. Furthermore, the first and/or second lines are more difficult to counterfeit because they necessitate high resolution production processes, in particular printing processes.

In the example depicted in FIG. 47 the first lines 14 are formed by a repetition of the letters "OF" in a positive image of opaque black color on a transparent background. To the naked eye the first lines 14 appear gray, the letters "OF" not being visible.

Figure 48:
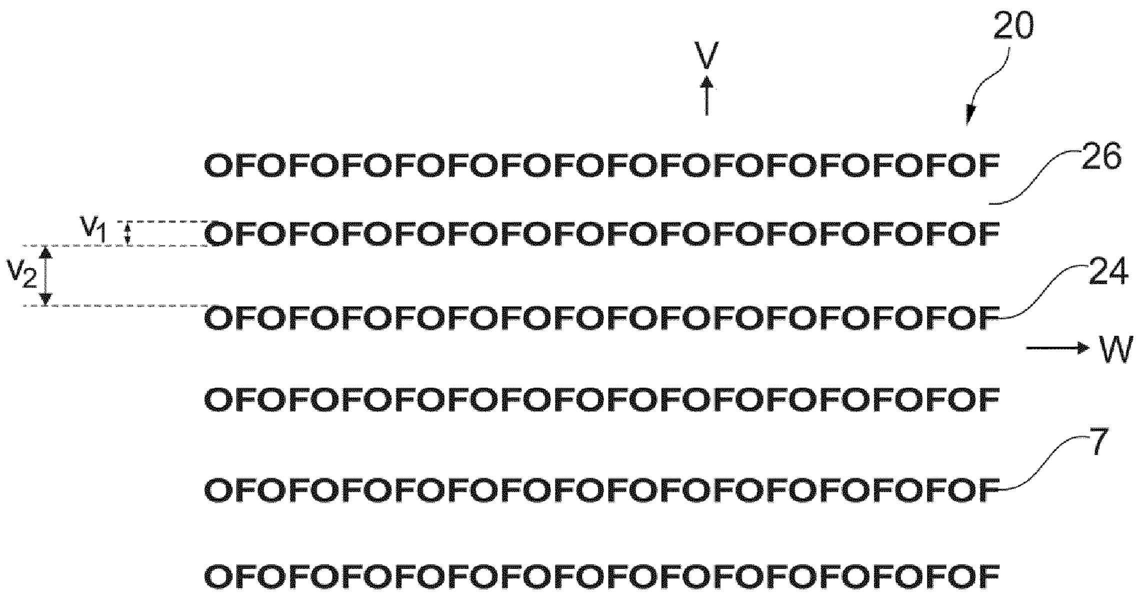
FIG. 48 is a detail of a variant second frame.

As depicted in FIG. 48 the first lines 24 of the second frame 20 may include micropatterns 7 as described above.

The invention is not limited to the examples depicted. The security-protected item may be produced with other first, second or third levels of security, for example. The revealed sub-images may differ not by their tone but their opacity. The revealed images may not be visible at all wavelengths, in particular visible by illumination with infrared or ultraviolet light or monochromatic light at a specific wavelength or polychromatic light with a spectrum over a specific range of wavelengths.

The expression "including one" must be understood as being synonymous with "comprising at least one".

The invention claimed is:

1. A security-protected item comprising:

a first frame and a second frame or an assembly of a security-protected item including a first frame and another object including a second frame, the first frame including a number n of first frame sub-frames each consisting of first frame first elementary patterns separated from one another in at least one common first frame extension direction by first frame second elementary patterns, the first frame first elementary patterns all having a same first frame first pattern dimension $x_1$ in the first frame extension direction and the first frame second elementary patterns all having a same first frame second pattern dimension $x_2$ in the first frame extension direction, the first frame second elementary patterns being of visually different appearance under at least one given illumination condition of the first frame first elementary patterns, the n first frame sub-frames being all phase shifted relative to one another in the first frame extension direction by a distance $d_{xij}$ less than $x_1+x_2$ and substantially equal to a multiple k of a smallest phase shift m between the n first frame sub-frames, k being between 1 and n−1 inclusive, n being greater than or equal to 3, the smallest phase shift m being different from a multiple of a smallest dimension $x_1$ of the first pattern of the first frame and $x_2$ of the first frame second pattern in the first frame extension direction, the second frame consisting of second frame first elementary patterns separated from one another in at least one second frame extension direction by second frame second elementary patterns, the second frame first elementary patterns all having a same second frame first pattern dimension $v_1$ in the second frame extension direction and the second frame second elementary patterns all having a same second frame second pattern dimension $v_2$ in the second frame extension direction, the second frame second elementary patterns being of visually different appearance under said at least one given condition of illumination of the second frame first elementary patterns, a distance equal to $x_1+x_2$ in the first frame extension direction being a multiple of a distance equal to $v_1+v_2$ in the second frame extension direction, the item or the assembly being configured so that, when the first frame and the second frame are superimposed the first frame is visible at least in part at least through the second frame second elementary patterns and/or the second frame is visible at least in part at least through the first frame second elementary patterns.

2. The item or assembly as claimed in claim 1 wherein the first and second frame elementary patterns of the first and/or second have visually different tones and/or opacities.

3. The item as claimed in claim 1 wherein the first frame and/or the second frame have a frame resolution greater than or equal to 800 dpi.

4. The item or assembly as claimed in claim 1, said item or assembly being configured so that, when the first frame and the second frame are superimposed, the first frame is visible at least in part at least through the second elementary patterns of the second frame and the second frame is visible at least in part through at least second elementary patterns of the first frame.

5. The item or assembly as claimed in claim 1, wherein the first frame second elementary patterns of each of the n sub-frames of the first frame and/or the second frame have a weaker opacity than the first frame first elementary patterns of the same sub-frame or second frame at one wavelength at least.

6. The item or assembly as claimed in claim 1, wherein the first frame first elementary patterns are of one or more tones and/or have one or more different opacities of the tone or tones and/or an opacity or opacities of the second frame first elementary patterns.

7. The item or assembly as claimed in claim 1, wherein the first frame second elementary patterns of each of the n first frame sub-frames and the second frame are non-opaque at at least one wavelength.

8. The item or assembly as claimed in claim 1, wherein the first and second frame first elementary patterns have the same appearance.

9. The item or assembly as claimed in claim 1, wherein the first frame first elementary patterns are of one or more tones and/or one or more visually different opacities of the tone or tones and/or of an opacity or opacities of the second frame first elementary patterns.

10. The item or assembly as claimed in claim 1, wherein a distance $x_1+x_2$ in the first frame extension direction is substantially equal to the distance $v_1+v_2$ in the second frame extension direction.

11. The item or assembly as claimed in claim 1, wherein the number n of first frame sub-frames is greater than or equal to 4.

12. The item or assembly as claimed in claim 1, wherein a product (n−1) m is greater than or equal to $(x_1+x_2)/2$.

13. The item or assembly as claimed in claim 1, wherein the smallest phase shift m of the n first frame sub-frames is substantially equal to a ratio $(x_1+x_2)/n$.

14. The item or assembly as claimed in claim 1, wherein the dimension $x_1$ of the first frame elementary patterns in the extension direction is greater than the smallest phase shift m between the n first frame sub-frames.

15. The item or assembly as claimed in claim 1, wherein the first frame and/or second frame first and second elementary patterns are respectively first or second frame first and second lines extending in a line direction of said first or second frame direction, the line direction of said first or second frame forming a non-zero angle α with the extension direction of said first or second frame.

16. The item or assembly as claimed in claim 15, wherein the first frame first lines all have the same uniform appearance over all their surface, the first frame second lines all have the same uniform appearance over all their surface, the second frame first lines all have the same uniform appearance over all their surface, and the second frame second lines all have the same uniform appearance over all their surface.

17. The item or assembly as claimed in claim 15, wherein first and/or second frame first and/or second lines each have at least two first or second frame first or second line portions of uniform appearance having the same width as the corresponding first or second frame first or second lines, the two first or second frame first or second line portions having different appearances, the first and/or the second frame having by virtue of the contours of the first or second line portions a particular shape.

18. The item or assembly as claimed in claim 1, wherein the first and/or the second frame appear(s) in a zone of the security-protected item that is at least partially transparent, the first and/or the second frame being superimposed by folding the security-protected item or by superimposing the security-protected item with the other object.

19. The item or assembly as claimed in claim 1, wherein the first and second frames are superimposed when separated from one another by a gap of constant thickness e formed by a transparent or translucent substrate featuring, on a side of a first face of the substrate, the first frame and, on a side of a second face of the substrate opposite the first, the second frame superimposed on the first frame.

20. The item or assembly as claimed in claim 1, wherein the other object is an electronic imaging device enabling a first image to be formed to be able to superimpose the first image on a second image on the security-protected item, the first image being one of the first frame and the second frame and the second image being the other of the first frame and the second frame.

21. A method for authenticating a security-protected item or an assembly as claimed in claim 1, wherein a revealed image is observed by superimposition of the first and second frames with aligned first and second frame extension directions and a conclusion is drawn as to an authenticity of the item at least on a basis of that observation.

22. The method as claimed in claim 21, wherein observation of the revealed image includes identification of a particular pattern including a plurality of revealed sub-images at least two of which have different appearances.

23. The method as claimed in claim 21, wherein said method further includes changing a position of the first frame and the second frame relative to one another, in particular by changing an observation angle and/or a position of the second frame relative to the first frame, and observing a change of appearance of the revealed image at a level of one or more sub-frames and drawing a conclusion as to an authenticity of the item at least on a basis of that observation.

* * * * *